(12) United States Patent
Takebayashi et al.

(10) Patent No.: US 6,835,148 B2
(45) Date of Patent: Dec. 28, 2004

(54) METHOD AND APPARATUS FOR PREVENTING IMPROPER SHIFTING OF A BICYCLE TRANSMISSION

(75) Inventors: Haruyuki Takebayashi, Yao (JP); Tadashi Ichida, Ikoma (JP); Satoshi Kitamura, Kitakatsuragi-gun (JP)

(73) Assignee: Shimano, Inc., Sakai (JP)

( * ) Notice: Subject to any disclaimer, the term of this patent is extended or adjusted under 35 U.S.C. 154(b) by 144 days.

(21) Appl. No.: 10/232,750

(22) Filed: Aug. 29, 2002

(65) Prior Publication Data

US 2004/0043851 A1 Mar. 4, 2004

(51) Int. Cl.[7] .............................................. F16H 59/00
(52) U.S. Cl. ........................................................ 474/70
(58) Field of Search ............................. 474/70, 80, 81, 474/82

(56) References Cited

U.S. PATENT DOCUMENTS

| | | | |
|---|---|---|---|
| 4,922,424 A | * | 5/1990 | Hiramatsu .................. 701/53 |
| 5,261,858 A | * | 11/1993 | Browning .................... 474/69 |
| 5,358,451 A | | 10/1994 | Lacombe et al. |
| 5,618,241 A | | 4/1997 | Ose |

* cited by examiner

Primary Examiner—David A. Bucci
Assistant Examiner—Bradley J. Van Pelt
(74) Attorney, Agent, or Firm—James A. Deland

(57) ABSTRACT

A bicycle control device is provided that uses power from a rotating member to assist the operation of a bicycle mechanism, wherein the control device includes an input member that requests assistance of the rotating member and an output member that is assisted by the rotating member, and wherein the input member electrically moves from a first position to a second position and then to a third position. A method of operating the control device comprises the steps of providing an input signal for moving the input member from the first position to the second position and then to the third position; sensing a position of the input member with an input position sensor; and determining whether the input position sensor indicates the input member is in the third position.

29 Claims, 29 Drawing Sheets

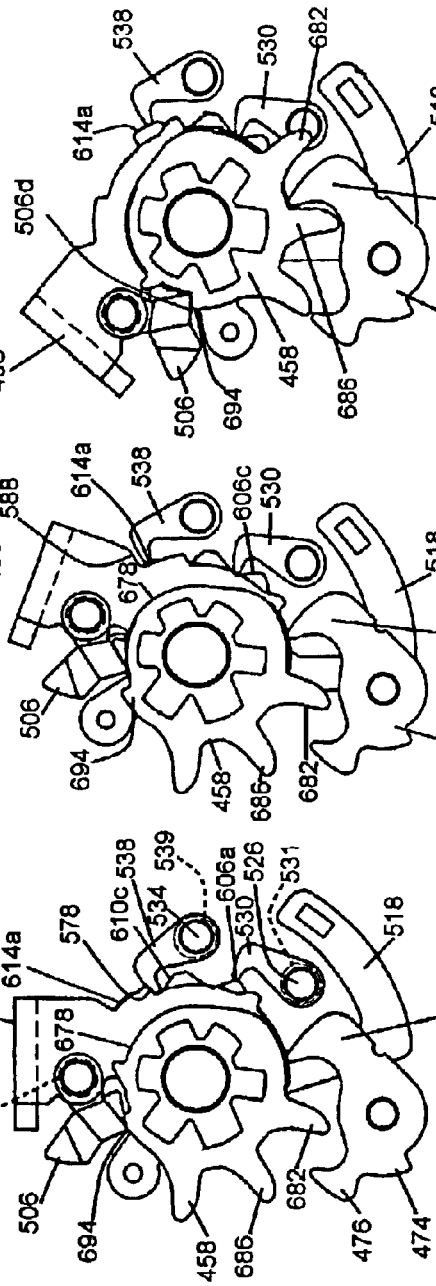

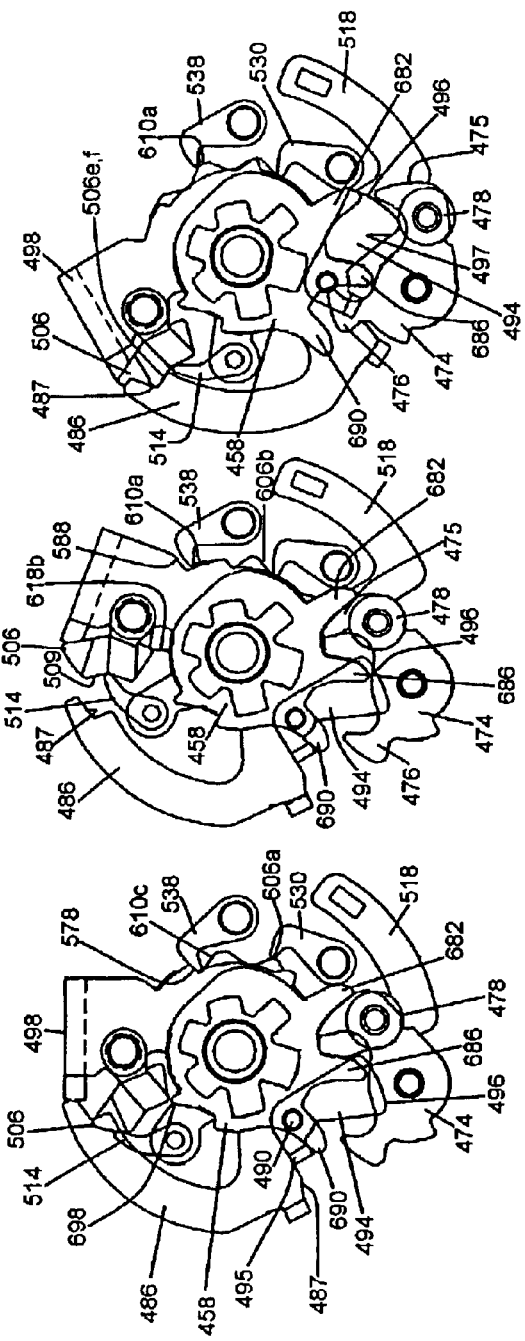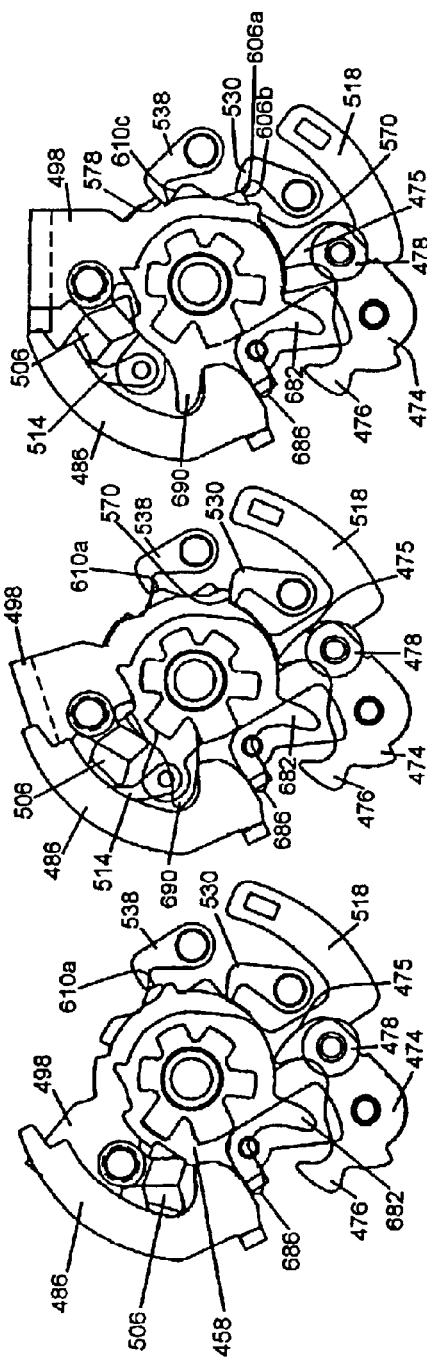

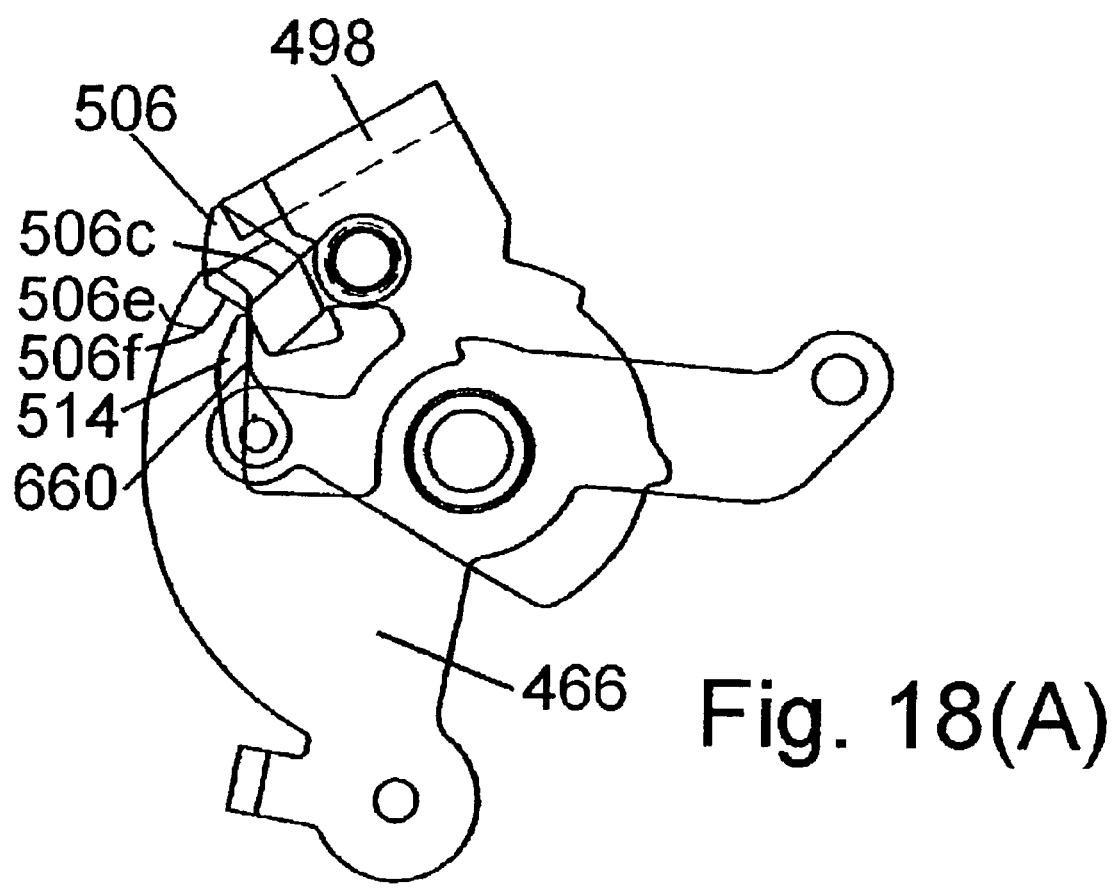

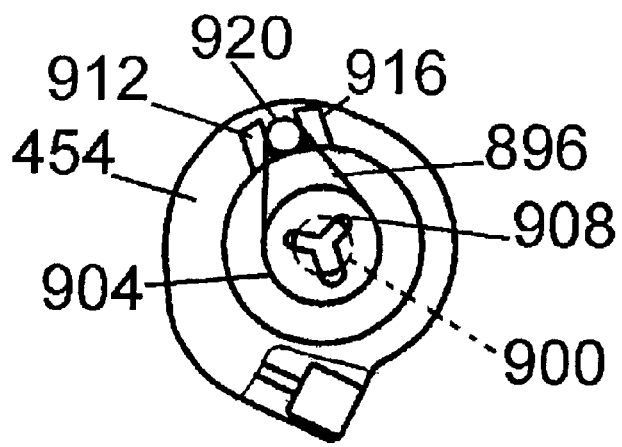
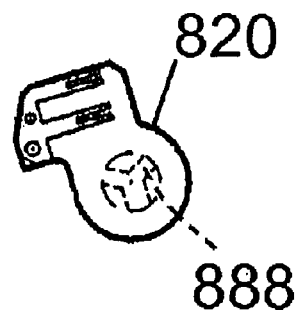
Fig. 22(A)　　Fig. 23(A)
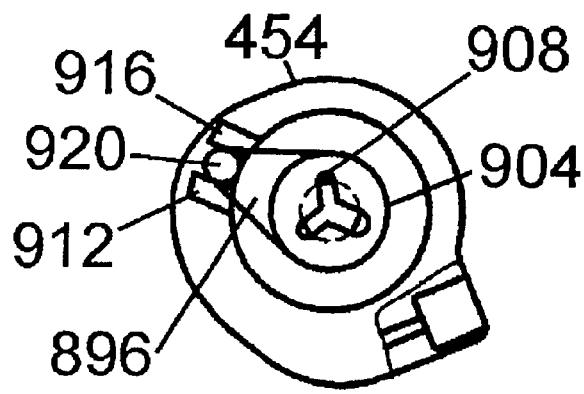
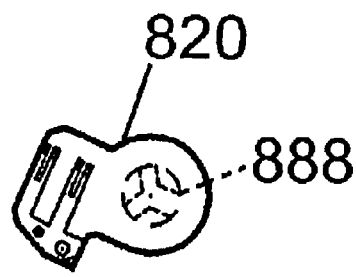
Fig. 22(B)　　Fig. 23(B)
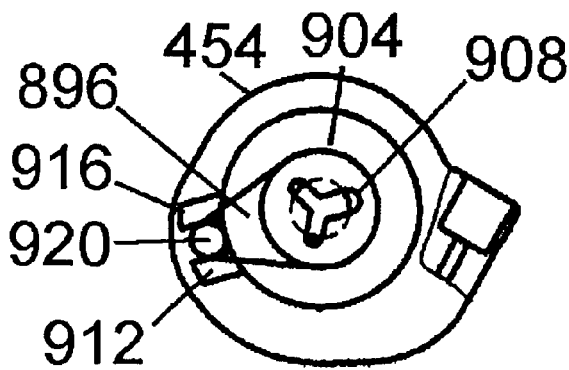
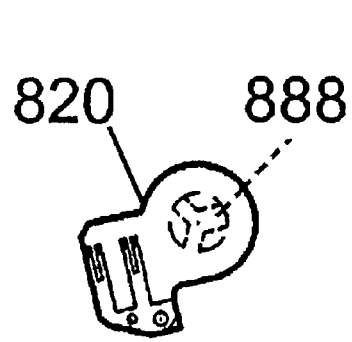
Fig. 22(C)　　Fig. 23(C)

METHOD AND APPARATUS FOR PREVENTING IMPROPER SHIFTING OF A BICYCLE TRANSMISSION

BACKGROUND OF THE INVENTION

The present invention is directed to bicycle transmissions and, more particularly, to features in an apparatus for assisting a speed change operation in the bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358, 451. The devices shown therein for assisting the operation of a rear derailleur employ multiple moving parts that are in constant motion, thus increasing the amount of moving mass as well as the possibility of premature wear on the components. Devices shown therein for assisting the operation of a front derailleur accommodate only two front sprockets. However, many bicycles have more than two front sprockets. Thus, there is a desire for an assist device that can be used with more than two sprockets.

Some assisting devices use electric motors or solenoids to control the assisting operation. The electric motor or solenoid may operate for the entire shifting operation or for only a part of the shifting operation, and it is often necessary to provide cams or other mechanical control structures to control the amount of involvement of the motor or solenoid. Such control structures often have an intricate structure or require complicated cooperation between the structures.

Furthermore, such motors or solenoids often are placed in a location where they will encounter large operating forces. This requires the motors and solenoids to have a heavy-duty construction, thus increasing the size, weight and cost of the device. However, even heavy-duty motors and solenoids may operate improperly, and it is desirable to know when such faulty operation occurs. Thus, there is a need for an assist mechanism wherein electronic components can be manufactured to function reliably at a reasonable cost.

SUMMARY OF THE INVENTION

The present invention is directed to various features of an apparatus for assisting an operation in a bicycle mechanism. One inventive feature is directed to a bicycle control device that uses power from a rotating member to assist the operation of a bicycle mechanism, wherein the control device includes an input member that requests assistance of the rotating member and an output member that is assisted by the rotating member, and wherein the input member electrically moves from a first position to a second position and then to a third position. A method of operating the control device comprises the steps of providing an input signal for moving the input member from the first position to the second position and then to the third position; sensing a position of the input member with an input position sensor; and determining whether the input position sensor indicates the input member is in the third position. Additional inventive features may be combined to provide additional benefits, as will become readily apparent when reading the following detailed description.

BRIEF DESCRIPTION OF THE DRAWINGS

FIGS. 16(A)–(E) are views illustrating the operation of the assist mechanism in an upshifting direction;

FIGS. 17(A)–(F) are views illustrating the operation of the assist mechanism in a downshifting direction;

FIGS. 18(A) and 18(B) are views illustrating the cooperation of the motion transmitting pawl with the middle plate during a downshifting operation;

FIGS. 22(A)–22(C) are views showing movement of the output transmission member when coupled to a position sensor coupling member;

FIGS. 23(A)–23(C) are views showing movement of an output transmission member position sensor that is coupled to the output transmission member;

DETAILED DESCRIPTION OF THE EMBODIMENTS

Figure 1:
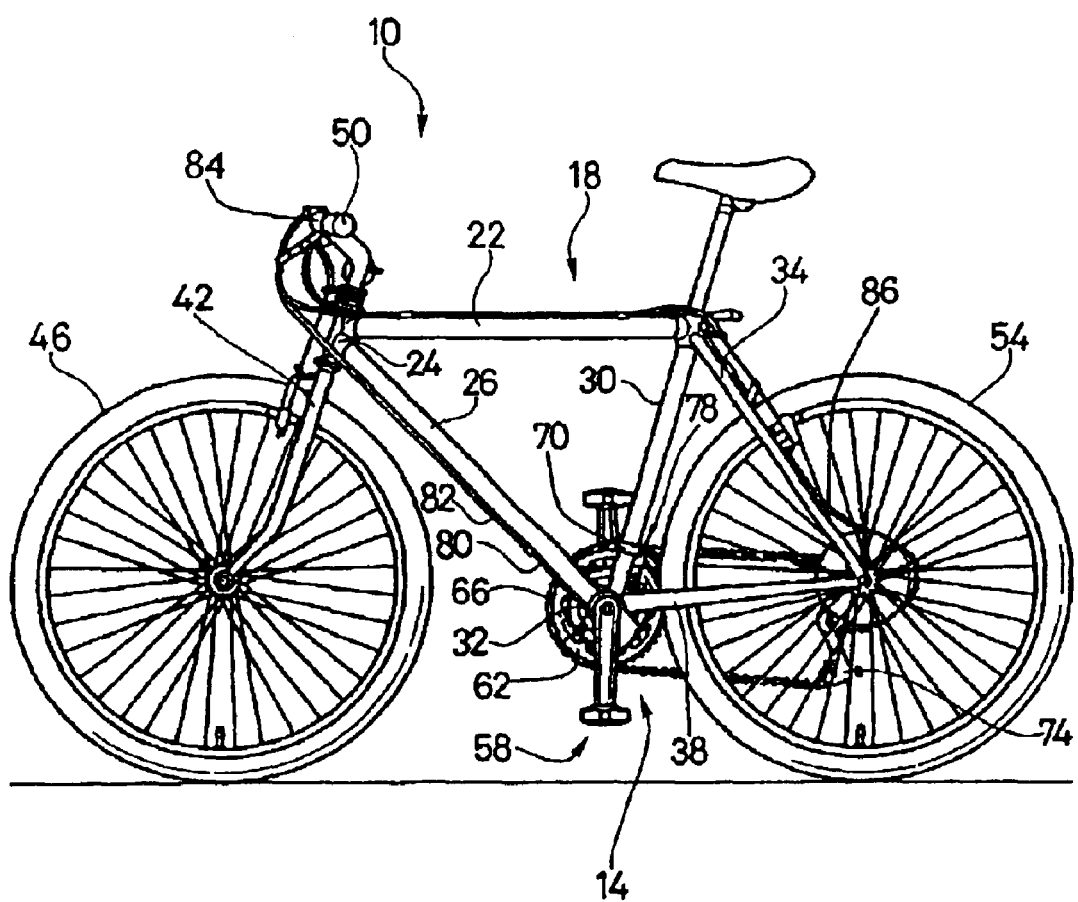
FIG. 1 is a side view of a particular embodiment of a bicycle that incorporates an apparatus for assisting a speed change operation in a bicycle transmission.

FIG. 1 is a side view of a bicycle 10 that incorporates a particular embodiment of an assist mechanism 14 according to the invention for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A fork 42 is rotatably supported within head tube 24, and a front wheel 46 is rotatably supported to the lower end of fork 42. The rotational direction of fork 42 and wheel 46 is controlled by a handlebar 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54. A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire 78 coupled to assist mechanism 14, and assist mechanism 14 is controlled by an inner wire 80 of a Bowden-type control cable 82 connected to a shift control device 84 mounted to the left side of handlebar 50. Rear derailleur 74 is controlled by a Bowden-type control cable 86 in a conventional manner.

Figure 2:
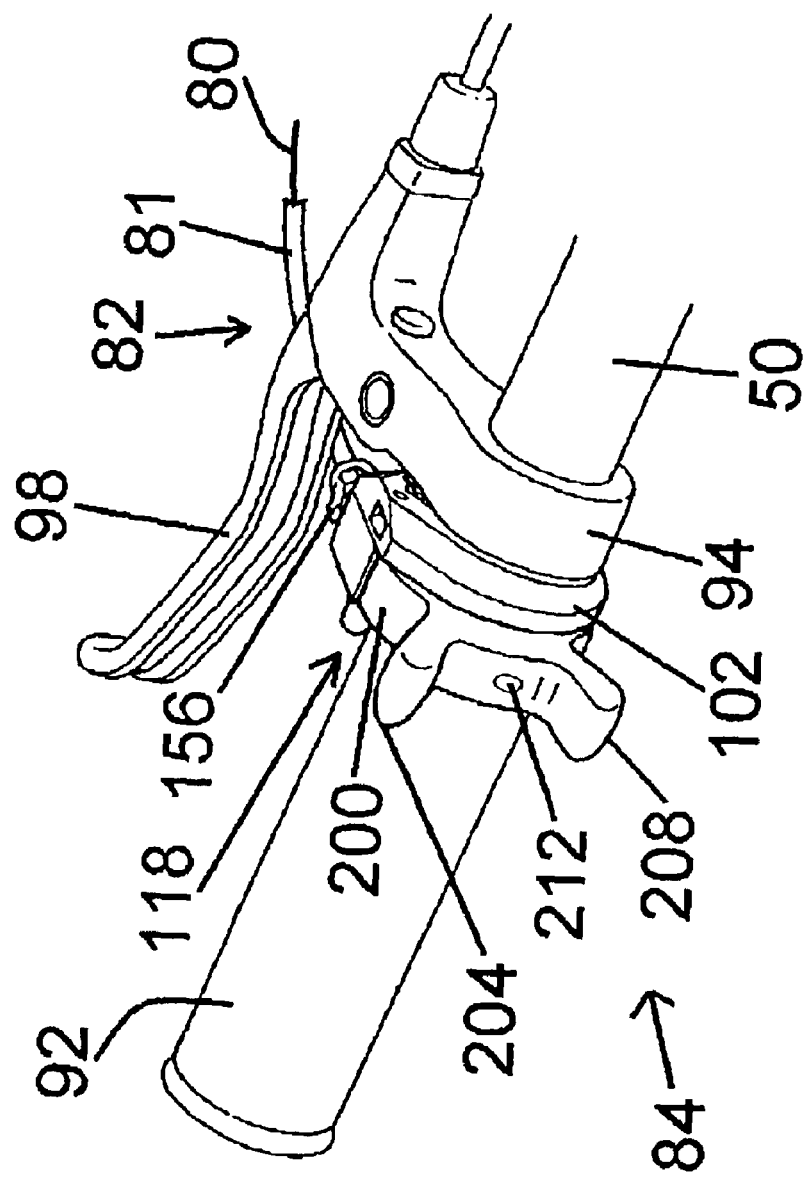
FIG. 2 is a more detailed view of the shift control device.
Figure 3:
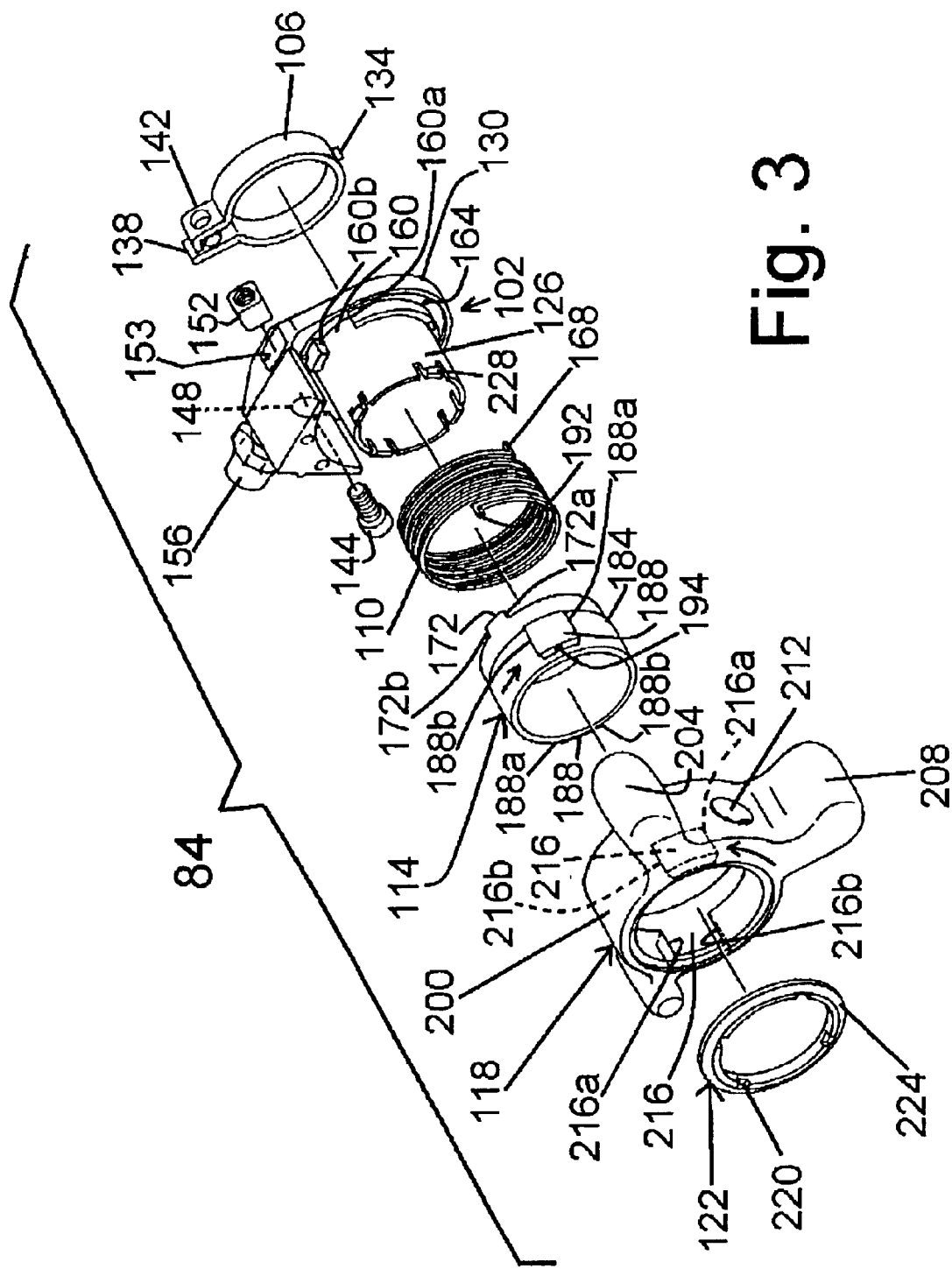
FIG. 3 is an exploded view of the shift control device shown in FIG. 2.

FIG. 2 is a view of the left side of handlebar 50 showing shift control device 84 in more detail, and FIG. 3 is an exploded view of shift control device 84. In this embodiment, shift control device 84 is mounted between a stationary handgrip 92 and a conventional brake lever bracket 94 that supports a brake lever 98. Shift control device 84 comprises a base member 102, a clamping band 106, a biasing component in the form of a spring 110, an intermediate member 114, an actuating component 118, and a retainer 122. Base member 102 comprises a tubular portion 126 and a flange portion 130. Tubular portion 126 surrounds handlebar 50, and flange portion 130 extends radially outwardly from an inner end of tubular portion 126. Clamping band 106 has a locking projection 134 and mounting ears 138 and 142, and the structure fits within an annular recess (not shown) with a locking groove formed at the inner peripheral surface of flange portion 130. A screw 144 extends through an opening 148 in flange portion 130 and through mounting ears 138 and 142 and screws into a nut 152 disposed in another opening 153 in flange portion 130 to tighten mounting ears 138 and 142 toward each other and thereby tighten clamping band 106 and fasten base member 102 to handlebar 50. A conventional screw-type adjustable control cable coupler 156 is disposed on flange portion 130 for receiving the outer casing 81 of control cable 82 in a conventional manner. Diametrically opposed recesses 160 (only one is visible in FIG. 3) having abutments 160*a* and 160*b* are formed at the junction of tubular portion 126 and flange portion 130, and a base member bias engaging component 164 in the form of a spring hole is formed in flange portion 130. An end 168 of spring 110 is fitted within spring hole 164.

Intermediate member 114 is rotatably supported on tubular portion 126 of base member 102 such that spring 110 is disposed between intermediate member 114 and flange portion 130 of base member 102. Diametrically opposed projections or stoppers 172 (only one is visible in FIG. 3) forming abutments 172*a* and 172*b* extend axially from the inner end of intermediate member 114, and a pair of diametrically opposed intermediate member projections or stoppers 188 forming abutments 188*a* and 188*b* extend radially outwardly from an outer peripheral surface 184 of intermediate member 114. An end 192 of spring 110 is fitted within a spring opening 194 (which functions as an intermediate member bias engaging component) formed in one of the stoppers 188 for biasing intermediate member 114 clockwise. As a result, abutments 172*a* of stoppers 172 engage abutments 160*a* (which function as base member stoppers) to limit the rotation of intermediate member 114 relative to base member 102.

Actuating component 118 is rotatably supported by intermediate member 114 which, as noted above, is rotatably supported by the tubular portion 126 of base member 102. Thus, actuating component 118 rotates coaxially around intermediate member 114, tubular portion 126 of base member 102, and handlebar 50. Actuating component 118 comprises a tubular member 200, first and second finger projections or levers 204 and 208 extending radially outwardly from tubular member 200, a transmission control member coupling component in the form of an opening 212 for receiving a cable end bead (not shown) attached to the end of inner wire 80 so that inner wire 80 moves integrally with actuating component 114, and diametrically opposed recesses 216 forming abutments 216*a* and 216*b*. In the assembled state, intermediate member stoppers 188 are fitted within the corresponding recesses 216 between abutments 216*a* and 216*b* so that abutments 216*a* and 216*b* function as actuating member stoppers. In this embodiment, inner wire 80 of control cable 82 is under tension as a result of a biasing component disposed in assist apparatus 14. Thus, actuating component 118 is biased in the counterclockwise direction such that abutments 188*a* of intermediate member stoppers 188 engage abutments 216*a* to limit the rotation of actuating component 118 relative to intermediate member 114 and base member 102.

Retainer 122 is fitted around the outer end of tubular member 126 of base member 102. Retainer 122 includes four recesses 220 that are evenly formed on a side surface 224 for engaging four locking tabs 228 that extend radially outwardly from the outer end of tubular portion 126 of base member 102. Thus, retainer 122 axially fixes actuating component 118 and intermediate member 114 in place on base member 102.

Figure 4A:
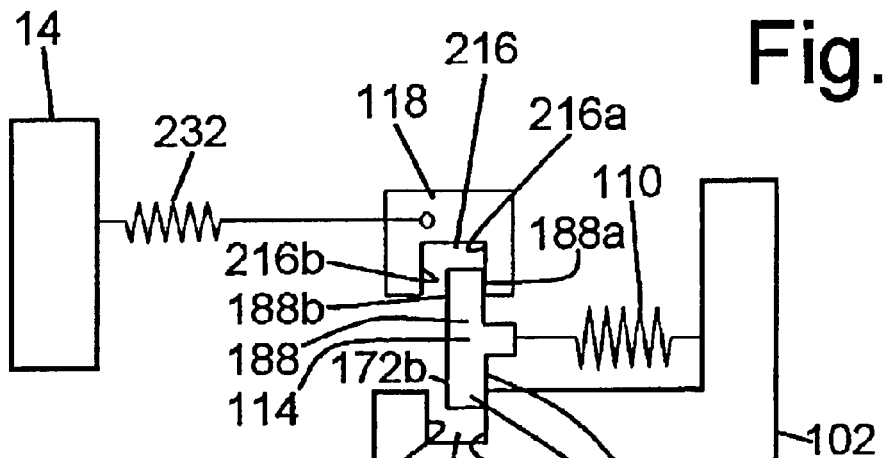
FIGS. 4(A)–(C) are schematic views showing the operation of the shift control device.
Figure 4B:
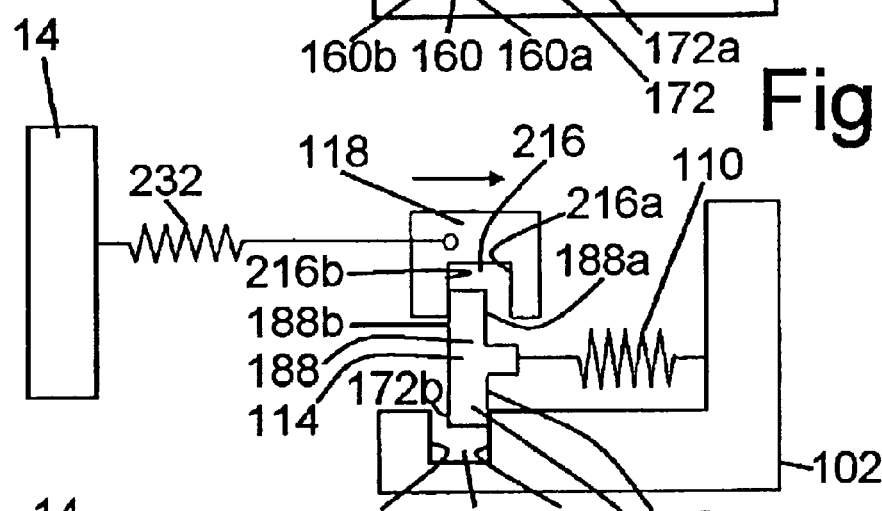
Figure 4C:
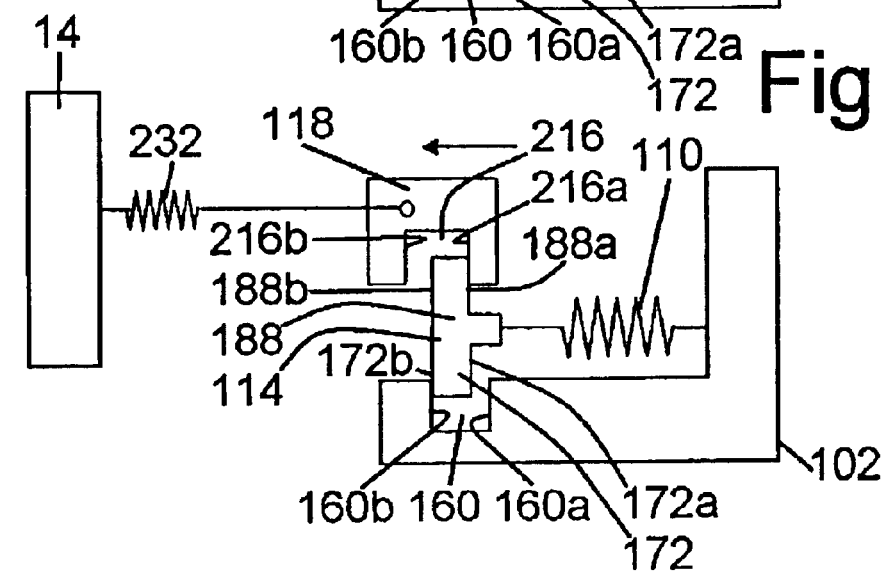

FIGS. 4(A)–4(C) schematically illustrate the operation of shift control device 84. FIG. 4(A) shows actuating component 118 in an actuating component neutral position. In this position, spring 110 biases intermediate member 114 clockwise (to the right in FIG. 4(A)) so that abutments 172*a* of stoppers 172 contact abutments 160*a* of recesses 160 on base member 102, and a biasing component (spring) in assist mechanism 14, indicated by reference number 232, biases actuating component 118 counterclockwise so that abutments 216*a* of recesses 216 contact abutments 188*a* of intermediate member stoppers 188. Thus, abutments 160*a*, 172*a*, 188*a* and 216*a* (and to some extent springs 110 and 232) function as neutral positioning components. Since inner wire 80 is directly coupled to actuating component 118, inner wire 80 likewise is in a transmission control member neutral position at this time.

Rotating actuating component 118 clockwise from the position shown in FIG. 4(A) against the biasing force of the biasing component 232 in assist mechanism 14 causes abutments 216b on actuating component 118 to contact abutments 188b on intermediate member stopper 188 as shown in FIG. 4(B). Intermediate member 114 remains stationary at this time. In FIG. 4(B), actuating component 118 is in an actuating component downshift position, and inner wire 80 is pulled into a transmission control member downshift position.

Rotating actuating component 118 counterclockwise from the position shown in FIG. 4(A) causes intermediate member 114 to rotate counterclockwise (to the left in FIG. 4(C)) against the biasing force of spring 110, since abutments 216a contact abutments 188a of intermediate member stoppers 188 and spring 110 is ultimately coupled between actuating component 118 and base member 102. As a result, actuating component 118 is in an actuating component upshift position, and inner wire 80 is released into a transmission control member upshift position.

Figure 5:
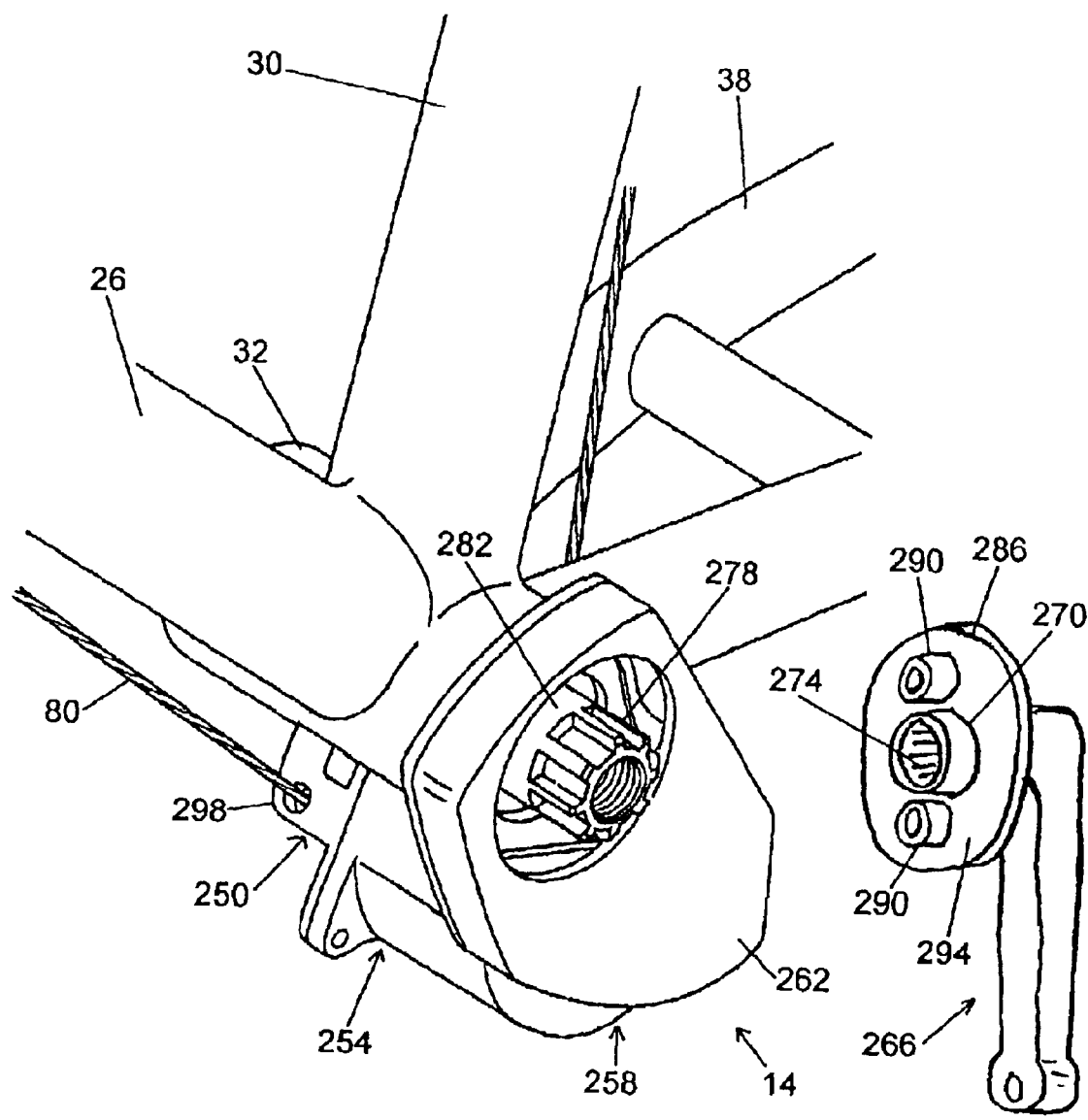
FIG. 5 is a closer view of the assist mechanism shown in FIG. 1.

FIG. 5 is a more detailed view of assist mechanism 14. As shown in FIG. 5, assist mechanism 14 is mounted to bottom bracket 32, and it includes an input unit 250, a positioning unit 254, and a rotating member engaging unit 258 with a cover 262. In this embodiment, assist mechanism 14 is used in conjunction with a crank arm 266 that includes an axle mounting boss 270 having a plurality of crank arm splines 274 that nonrotatably engage a plurality of axle splines 278 formed on the end of an axle 282 that is rotatably supported by bottom bracket 32 in a well known manner. A drive flange 286 extends radially outwardly from axle mounting boss 270 and supports a pair of diametrically opposed drive members 290. Drive members 290 have the shape of circular tubes that extend perpendicularly from the side surface 294 of drive flange 286.

Figure 6:
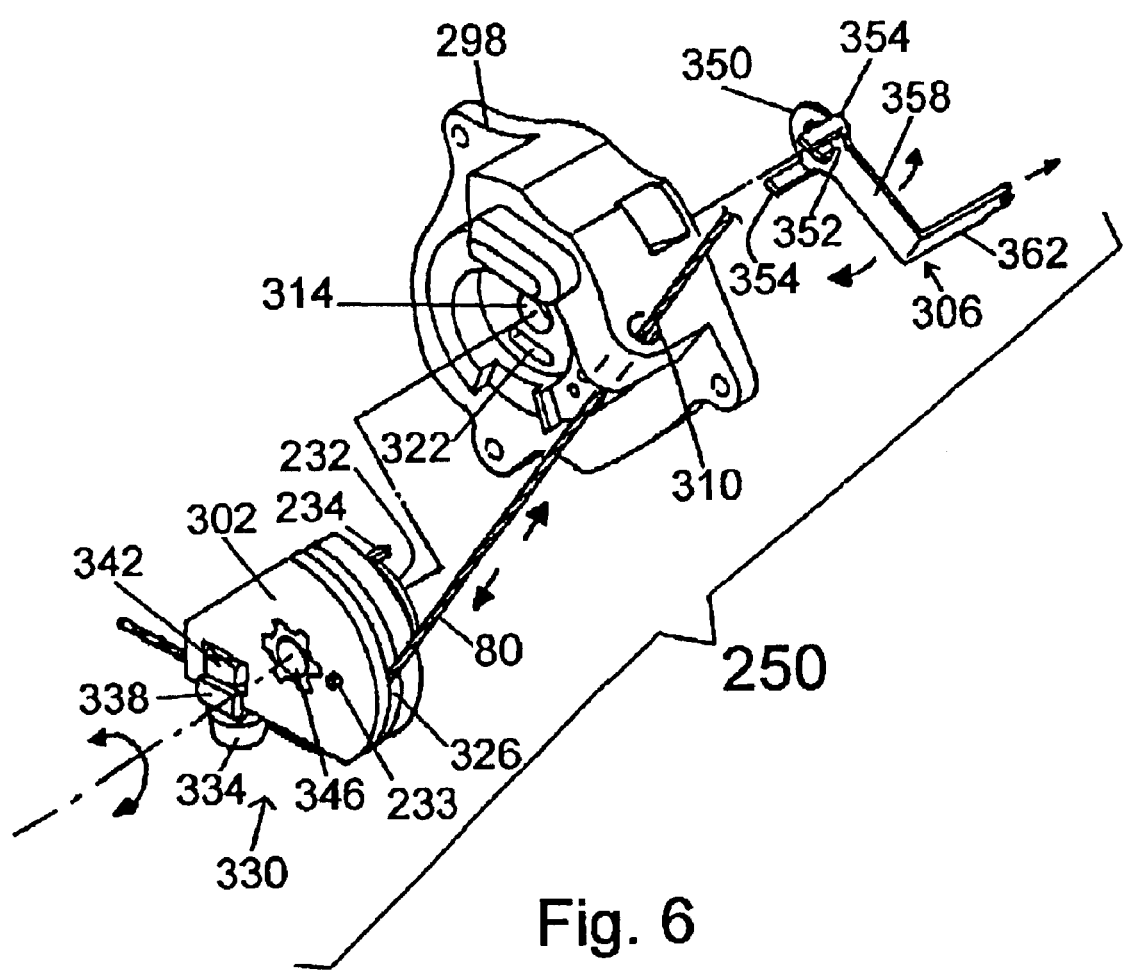
FIG. 6 is an exploded view of a particular embodiment of an input unit.

FIG. 6 is an exploded view of a particular embodiment of input unit 250. Input unit 250 includes an input unit mounting member 298, a wire coupling member 302, spring 232, and an input link 306. Input unit mounting member 298 has a guide channel 310 for inner wire 80, a central axle opening 314 for receiving an axle 318 (FIG. 10) of positioning unit 254 therethrough, and a pair of diametrically opposed openings 322 (only one opening is visible in FIG. 6). Wire coupling member 302 includes a wire winding groove 326 for winding and unwinding inner wire 80, a conventional wire coupler 330 in the form of a screw 334, a wire retainer 338 and a nut 342 for fixing inner wire 80 to wire coupling member 302, and an axle opening 346 for receiving axle 318 of positioning unit 254. Input link 306 functions to communicate the rotational position of wire coupling member 302 to positioning unit 254, and it includes an axle mounting portion 350 with an axle receiving opening 352, coupling tabs 354, a radially extending portion 358, and an axially extending coupling portion 362. Coupling tabs 354 extend axially from axle mounting portion 350, through openings 322 in input unit mounting member 298, and into corresponding openings (not shown) in wire coupling member 302 so that wire coupling member 302 and input link 306 rotate as a unit. Thus, both wire coupling member 302 and input link 306 will assume neutral, upshift and downshift positions corresponding to the positions of actuating component 118 of shift control device 84. Spring 232 has one end 233 mounted to wire coupling member 302 and another end 234 mounted to input unit mounting member 298 so that wire coupling member 302 and input link 306 are biased in the clockwise (wire winding) direction.

Figure 7:
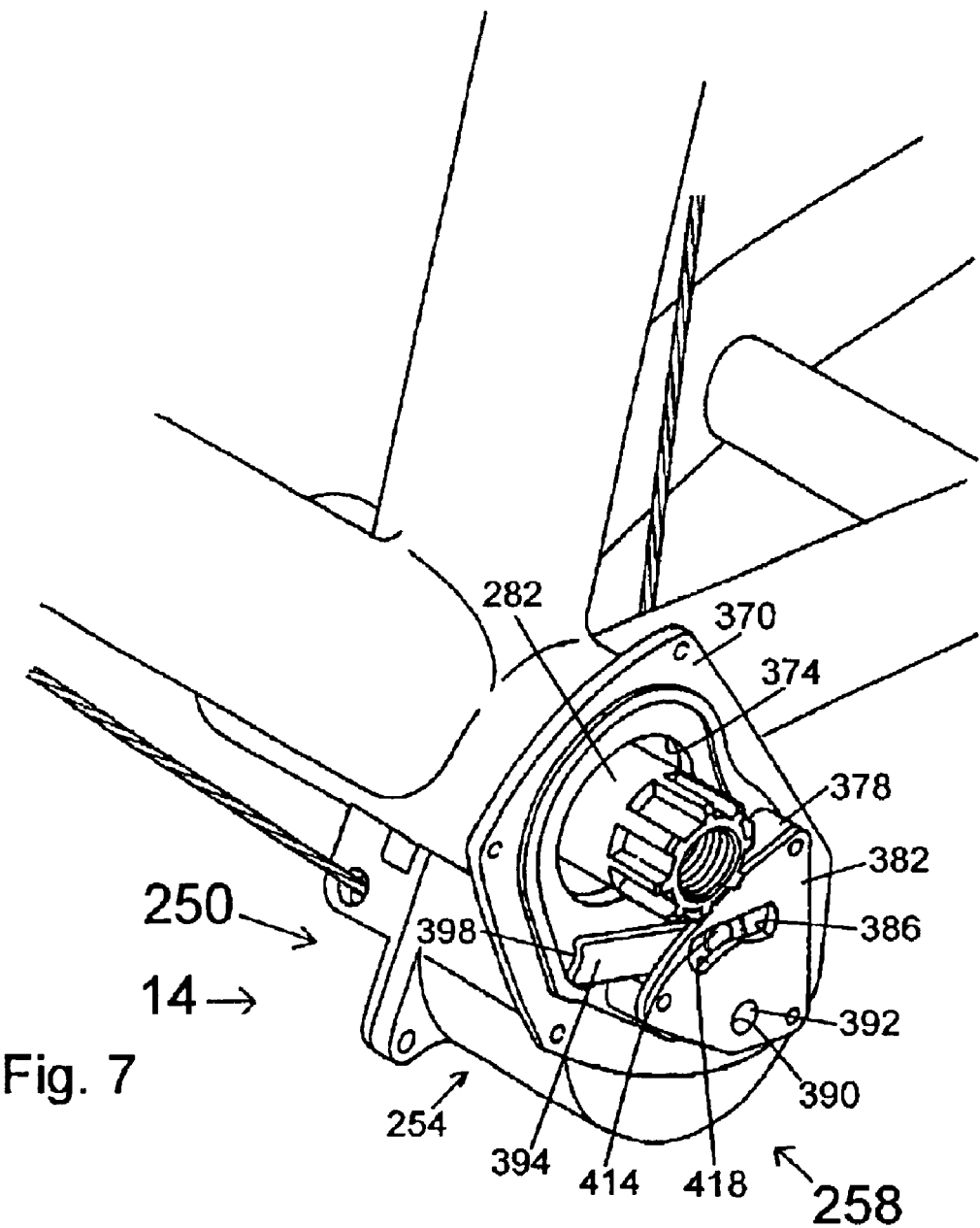
FIG. 7 is a view of the assist mechanism showing a particular embodiment of a rotating member engaging unit.
Figure 8:
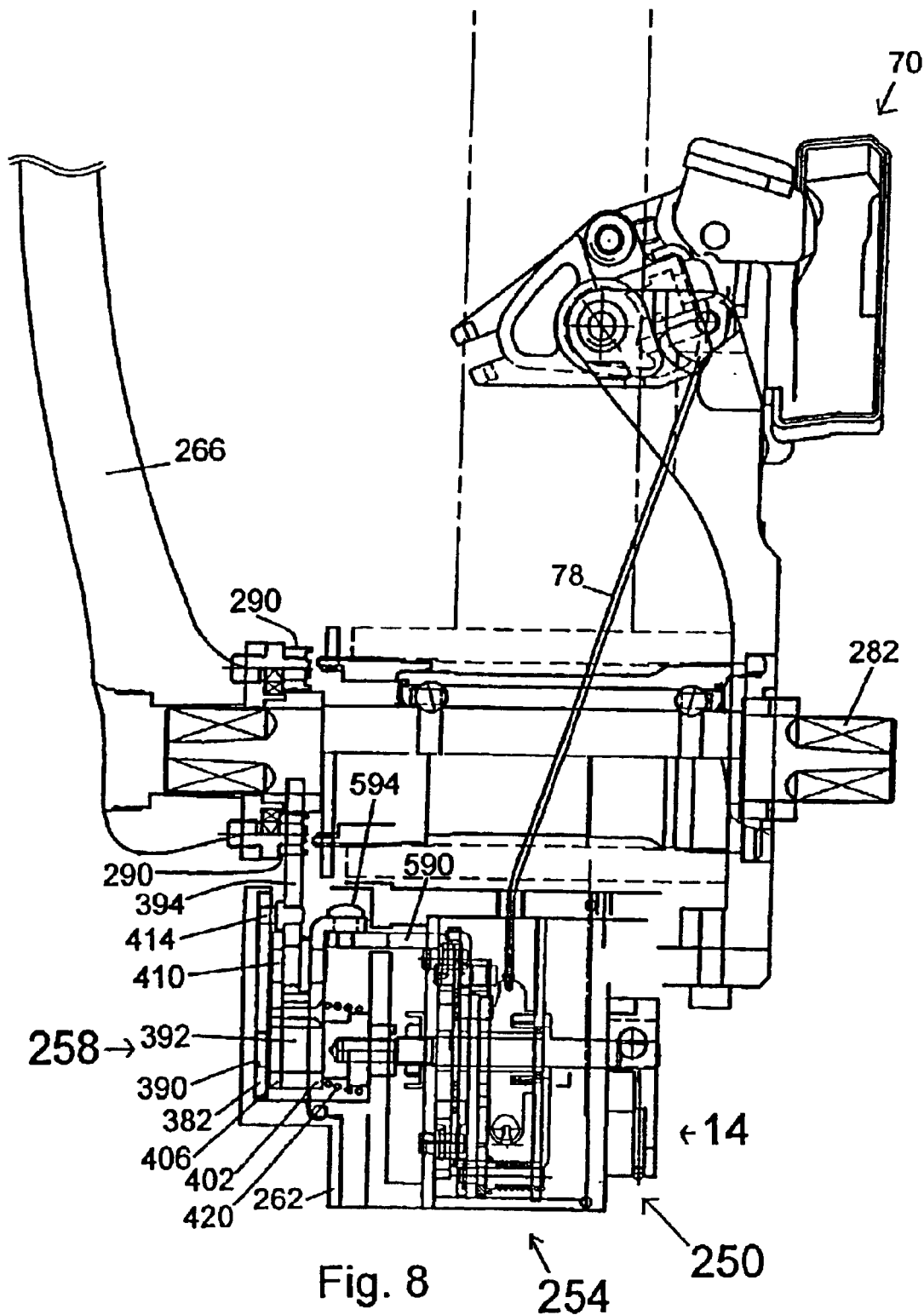
FIG. 8 is a rear cross sectional view of the assist mechanism.
Figure 9A:
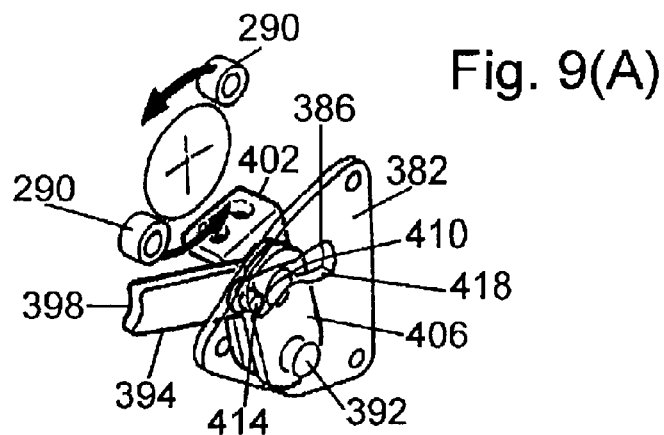
FIGS. 9(A)–9(D) illustrate the operation of the rotating member engaging member.

FIG. 7 is an oblique view of assist mechanism 14 with cover 262 of rotating member engaging unit 258 removed, FIG. 8 is a rear cross sectional view of assist mechanism 14, and FIGS. 9(A)–9(D) illustrate the operation of rotating member engaging unit 258. As shown in FIGS. 7, 8 and 9(A), rotating member engaging unit 258 includes a bottom bracket mounting member 370 with an opening 374 for receiving axle 282 therethrough, an axially extending side wall 378, a cam plate 382 with a control cam slot 386 attached to side wall 378, and an opening 390 for supporting a lower pivot shaft 392. One end of a rotating member engaging member 394 has an arcuate rotating member engaging surface 398 for engaging drive members 290 on crank arm 266. The other end of rotating member engaging member 394 is pivotably connected between a positioning unit interface plate 402 and a support plate 406 by a pivot shaft 410. A cam follower 414 that engages a control cam surface 418 formed by cam slot 386 is mounted to rotating member engaging member 394 in close proximity to pivot shaft 410. A spring 420 biases positioning unit interface plate 402 and support plate 406 in a counterclockwise direction.

Figure 9B:
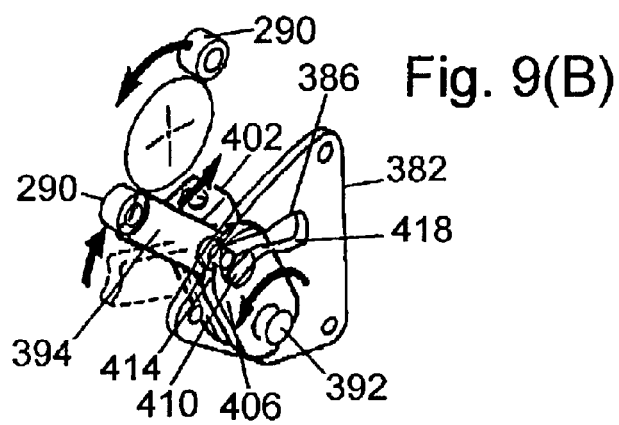
Figure 9C:
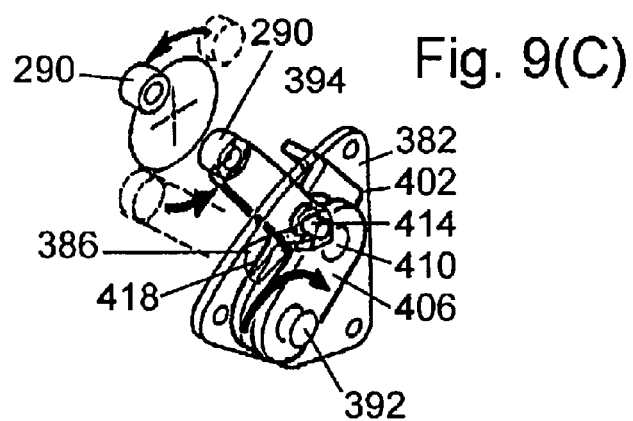
Figure 9D:
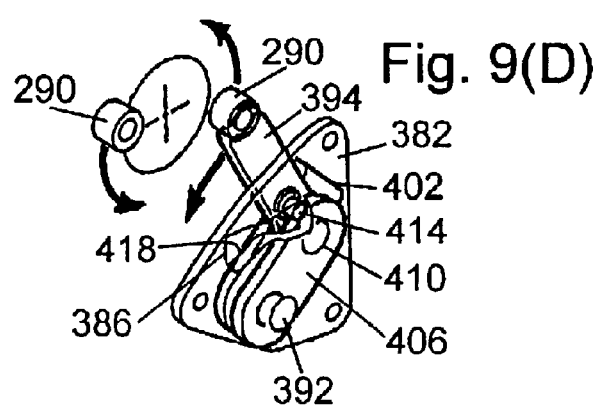

FIG. 9(A) shows rotating member engaging member 394 in a rotating member disengaging position, wherein drive members 290 rotate with crank arm 266 without causing any effect on assist mechanism 14. In general, when actuating component 118 of shift control unit 84 is rotated to either the upshift position or the downshift position, then positioning unit interface plate 402 and support plate 406 pivot counterclockwise as shown in FIG. 9(B). This causes rotating member engaging member 394 to pivot clockwise around pivot shaft 410, since cam follower 414 is retained within cam slot 386, to the rotating member engaging position shown in FIG. 9(B). In this position, rotating member engaging surface 398 is disposed in the path of drive members 290, so one of the drive members 290 will contact rotating member engaging surface 398 as shown in FIG. 9(B) and cause rotating member engaging member 394 to rotate positioning unit interface plate 402 and support plate 406 clockwise against the biasing force of spring 420 as shown in FIG. 9(C). As crank arm 266 continues to rotate, the engaged drive member 290 will disengage from rotating member engaging member 394, rotating member engaging member 394 will pivot counterclockwise as shown in FIG. 9(D) back to the rotating member disengaging position, and spring 420 will cause positioning unit interface plate 402 and support plate 406 to pivot counterclockwise back to the position shown in FIG. 9(A).

Figure 10:
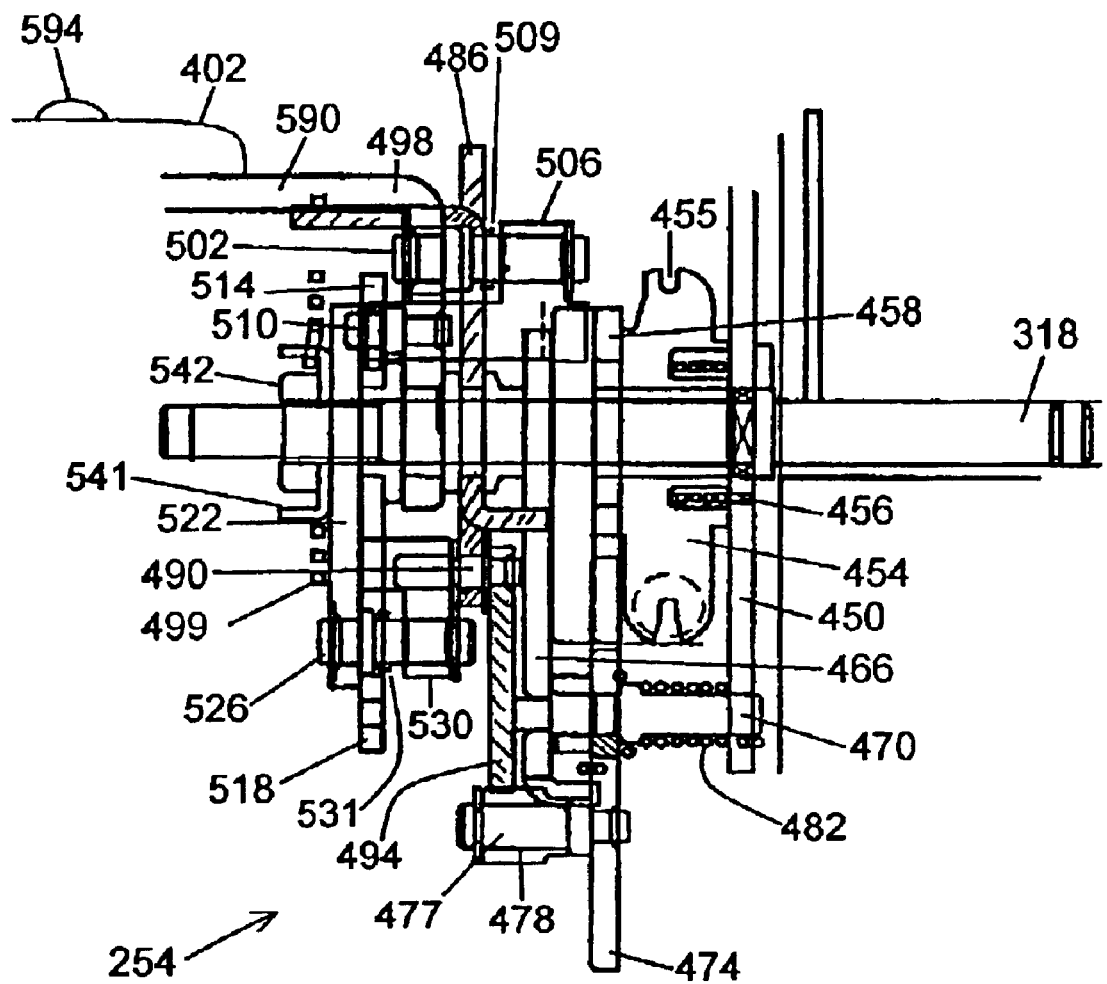
FIG. 10 is an enlarged cross sectional view of the internal components of the positioning unit shown in FIG. 8.

FIG. 10 is an enlarged rear cross sectional view of the internal components of positioning unit 254. As shown in FIG. 10, positioning unit 254 includes a base plate 450 supporting one end of a pawl shaft 470; an output transmission member in the form of a rotating member 454 rotatably supported on axle 318 and having a wire winding groove 455 for winding and unwinding output control wire 78 to a plurality of output positions; a biasing component in the form of a spring 456 for biasing rotating member 454 in a wire unwinding direction; a positioning member in the form of a positioning ratchet 458 coupled for integral rotation with rotating member 454; a middle plate 466 supporting the other end of pawl shaft 470; a position maintaining member in the form of a positioning pawl 474 supported by pawl shaft 470 for rotation between a position maintaining position and a position release position and having positioning teeth 475 and 476 (FIG. 15(A)); a pivot shaft 477 mounted to positioning tooth 475; a cam follower in the form of a cam roller 478 rotatably supported by pivot shaft 477; and a pawl spring 482 connected between positioning pawl 474 and base plate 450 for biasing positioning pawl 474 toward the position maintaining position (counterclockwise in FIG. 15(A)).

Positioning unit 254 further includes a release plate 486 rotatably supported on axle 318 and having a pivot shaft 490 supporting a cam member in the form of a cam plate 494; a motion transmitting member 498 rotatably supported on axle 318; a pawl shaft 502 mounted to motion transmitting member 498; a motion transmitting pawl 506 pivotably supported on pawl shaft 502; a spring 509 for biasing motion transmitting pawl 506 in the counterclockwise direction in FIG. 15(A); another pawl shaft 510 mounted to motion transmitting member 498; a mode change pawl 514 pivotably supported on pawl shaft 510; an input transmission member in the form of a control plate 518 rotatably supported on axle 318; a base plate 522; a pawl shaft 526 mounted to base plate 522 and supporting a switch-off drive control member in the form of a drive control pawl 530; a spring 531 for biasing drive control pawl 530 in the counterclockwise direction in FIG. 15(A); a pawl shaft 534 (FIG. 15(A)) mounted to base plate 522 and supporting a switch-on drive control member in the form of a drive control pawl 538; a spring 539 for biasing drive control pawl 538 in the counterclockwise direction in FIG. 15(A); a spring retainer 541; a spring 499 connected between spring retainer 541 and motion transmitting member 498 for biasing motion transmitting member 498 in the clockwise direction in FIG. 15(A), and a retaining nut 542 for axially retaining the components on axle 318. Base plate 450, base plate 522 and axle 318 function as mounting units for the various components.

Figure 11:
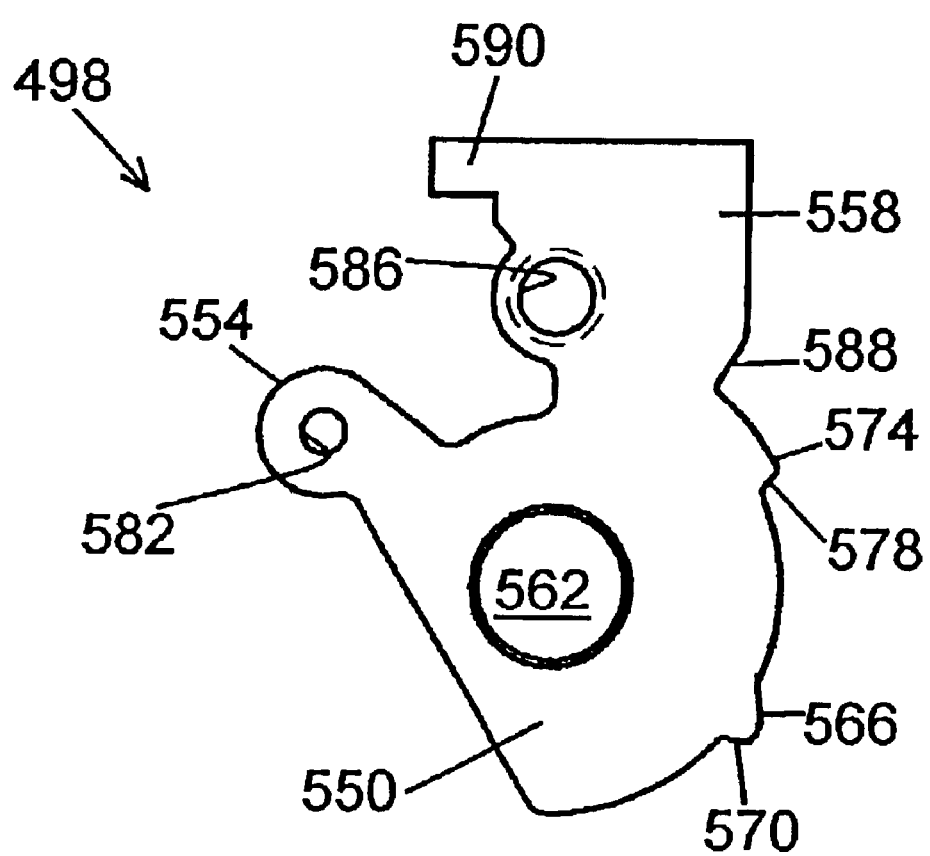
FIG. 11 is a side view of a particular embodiment of a motion transmitting member.

FIG. 11 is a side view of motion transmitting member 498. Motion transmitting member 498 includes a base portion 550, a pawl mounting ear 554 and a motion transmitting arm 558. Base portion 550 includes an opening 562 for receiving axle 318 therethrough, a radially outwardly extending projection 566 forming an abutment 570 for contacting drive control pawl 530, and a radially outwardly extending projection 574 forming an abutment 578 for contacting drive control pawl 538. Pawl mounting ear 554 includes an opening 582 for mounting pawl shaft 510 (which supports mode change pawl 514), and motion transmitting arm 558 likewise includes an opening 586 for mounting pawl shaft 502 (which supports motion transmitting pawl 506). Motion transmitting arm 558 also includes an abutment 588 for contacting drive control pawl 538, and an axially extending rotating member engaging unit interface plate 590 that attaches to positioning unit interface plate 402 through screws 594 as shown in FIGS. 8 and 10.

Figure 12:
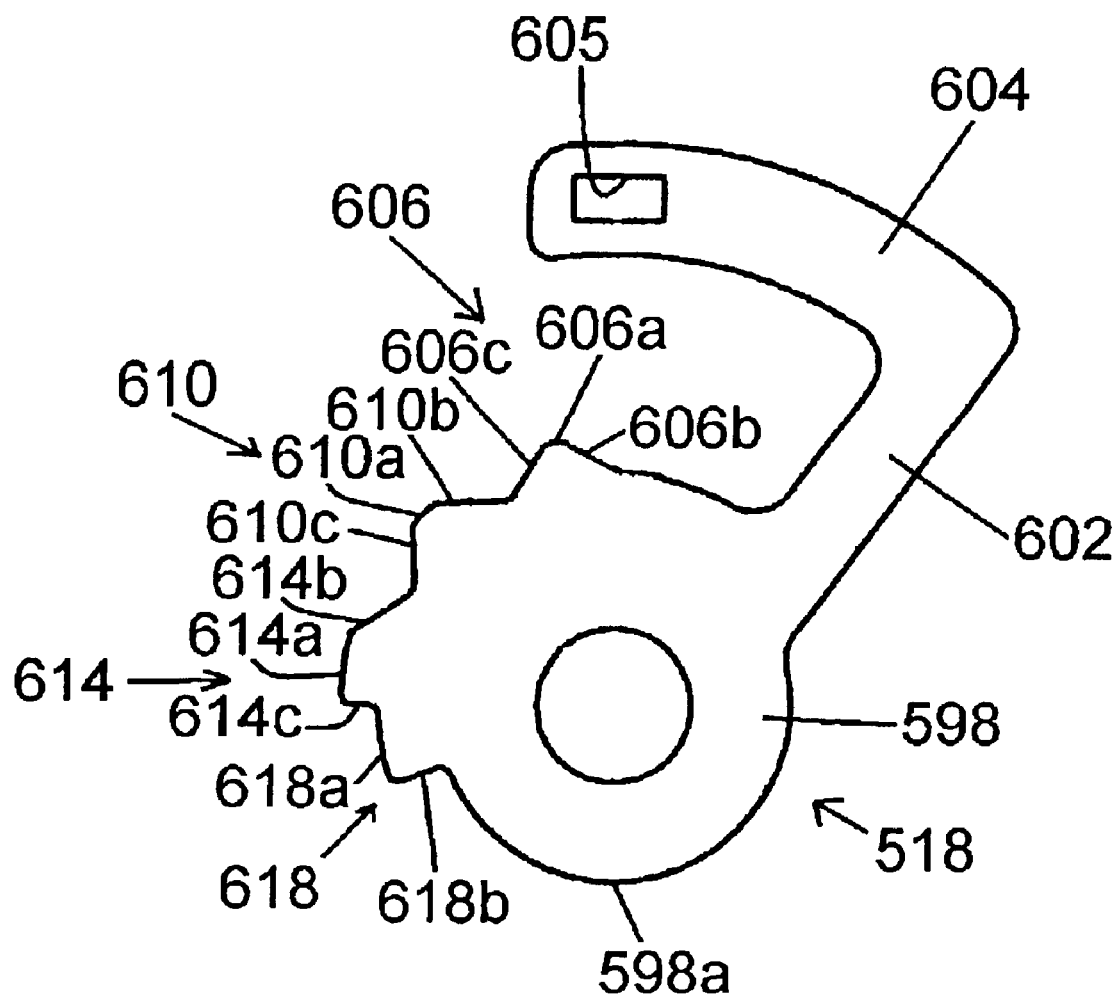
FIG. 12 is a side view of a particular embodiment of an input transmission member.

FIG. 12 is a side view of a particular embodiment of control plate 518. Control plate 518 includes an input control member in the form of a base portion 598, a lever arm portion 602, and an input unit interface plate 604. Input unit interface plate 604 includes an opening 605 for receiving coupling portion 362 (FIG. 6) of input link 306. Base portion 598 includes input control members in the form of radially extending drive control cam surfaces or lobes 606, 610, 614 and 618. Drive control cam lobe 606 includes an upper surface 606a and inclined ramps 606b and 606c. Similarly, cam lobe 610 includes an upper surface 610a and inclined ramps 610b and 610c. Cam lobe 614 includes an upper surface 614a, an inclined ramp 614b and a transition surface 614c extending from upper surface 614a to an upper surface 618a of cam lobe 618. Cam lobe 618 further includes a transition surface 618b extending from upper surface 618a to the outer peripheral surface 598a of base portion 598. It will become apparent from the description below that cam lobes 606, 610 and 614, drive control pawl 538 and motion transmitting member 498 with projection 578 comprise a switching mechanism to control the movement of rotating member engaging member 394 between the rotating member engaging position and the rotating member disengaging position.

Figure 13:
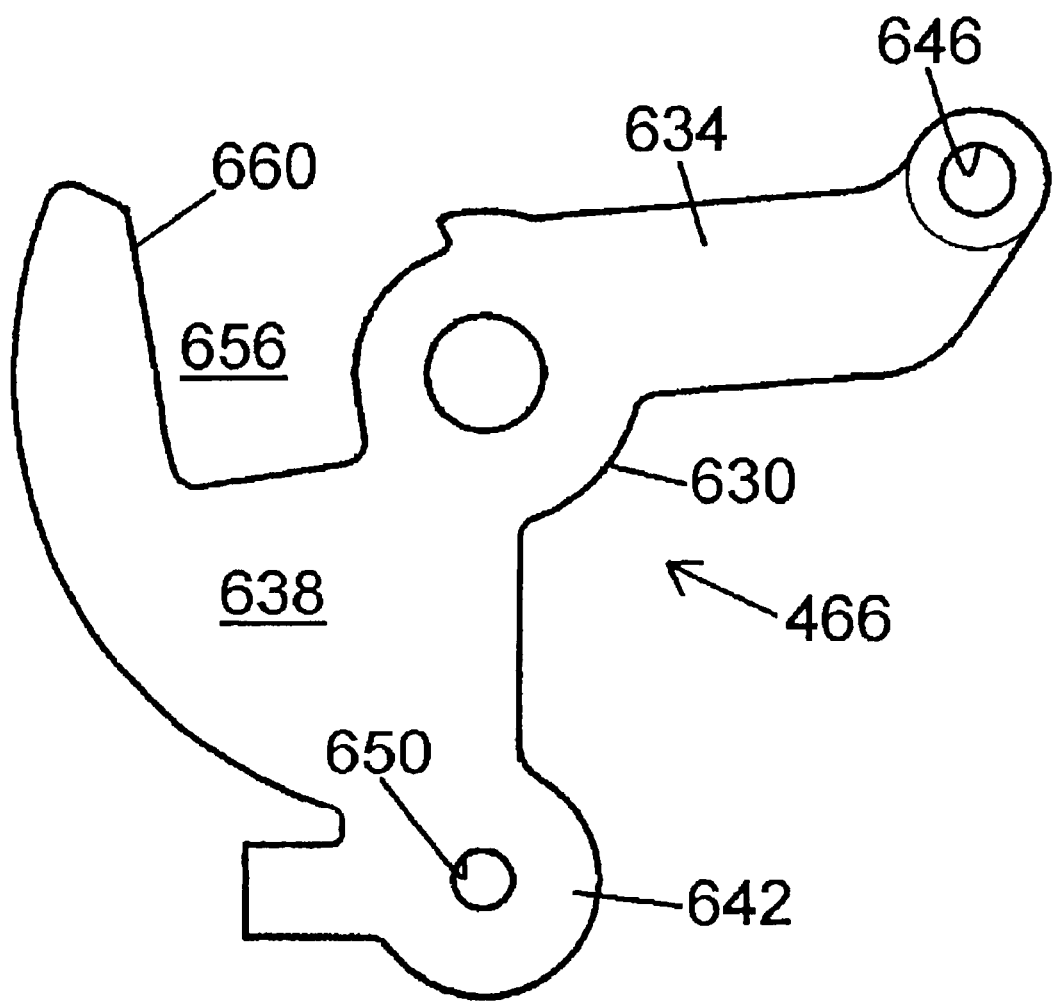
FIG. 13 is a side view of a particular embodiment of a middle plate.

FIG. 13 is a side view of a particular embodiment of middle plate 466. Middle plate 466 includes a base portion 630, a pawl coupling arm 634, a downshift control plate 638, and a pawl coupling portion 642 extending from downshift control plate 638. Pawl coupling arm 634 includes an opening 646 for receiving a fastener (not shown) used to attach the assembly to the housing, and pawl coupling portion 642 includes an opening 650 for attaching pawl shaft 470 (which supports positioning pawl 474). Downshift control plate 638 defines a recess 656 having a pawl control surface 660 that functions in a manner described below.

Figure 14:
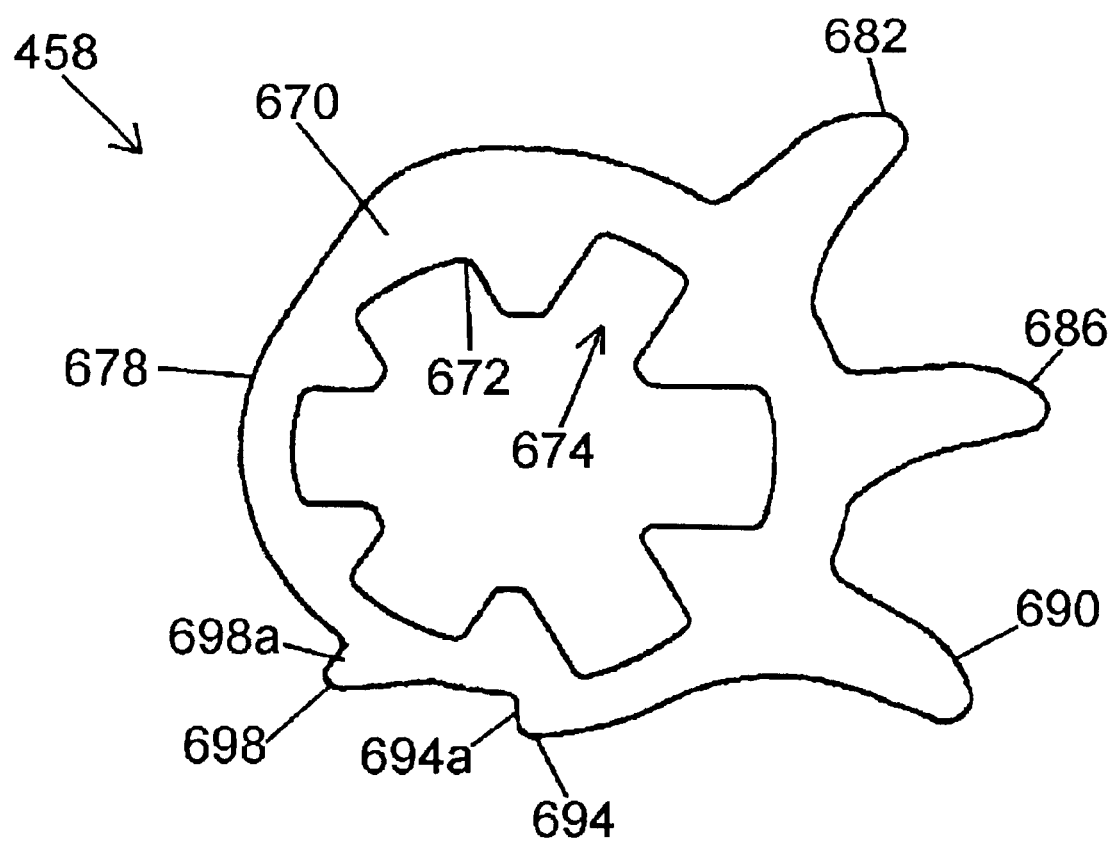
FIG. 14 is a side view of a particular embodiment of a positioning member.

FIG. 14 is a side view of positioning ratchet 458. Positioning ratchet 458 comprises a generally annular body 670 having an inner peripheral surface 672 forming a plurality of female splines 674 that nonrotatably engage a corresponding plurality of male splines (not shown) formed on rotating member 454 so that positioning ratchet 458 and rotating member 454 rotate as a unit. An outer peripheral surface 678 forms three positioning teeth 682, 686 and 690 and two drive teeth 694 and 698 defining drive surfaces 694a and 698a, respectively. With this structure, rotating member 454 can be set in three positions to accommodate three front sprockets 62. Such sprockets usually comprise a small diameter sprocket, an intermediate diameter sprocket, and a large diameter sprocket.

Figure 15:
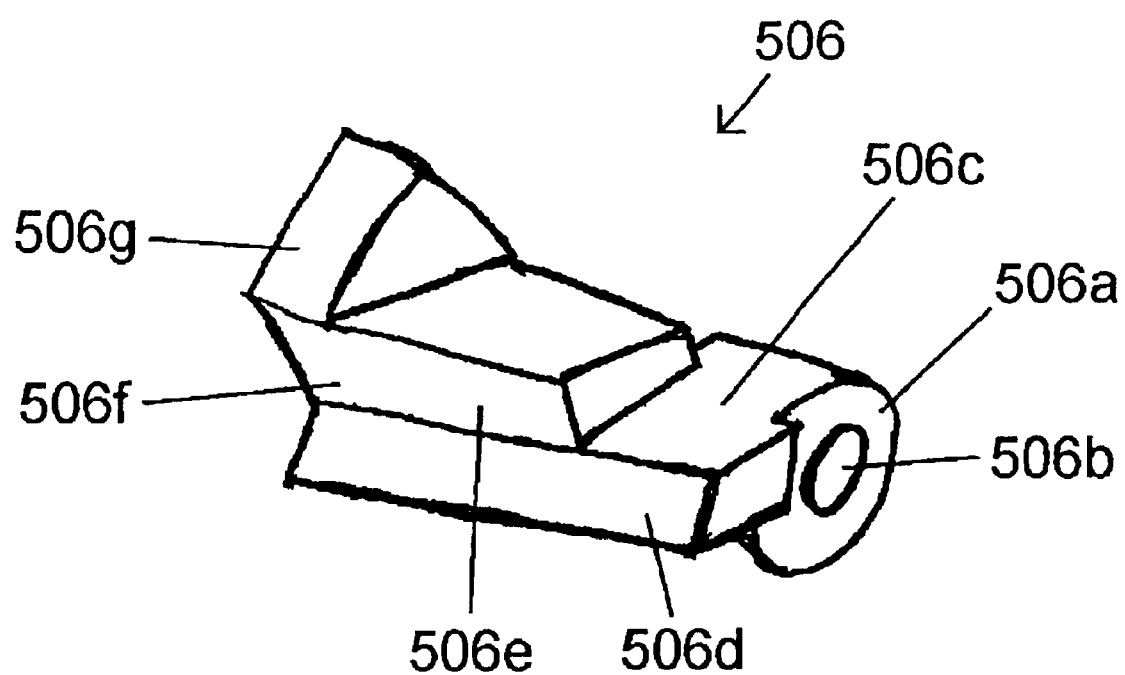
FIG. 15 is a perspective view of a particular embodiment of a motion transmitting pawl.

FIG. 15 is a perspective view of motion transmitting pawl 506. Motion transmitting pawl 506 includes a base portion 506a with an opening 506b for receiving pawl shaft 502, a downshift control surface 506c for contacting pawl control surface 660 of middle plate 466 in a manner described below, a positioning ratchet drive surface 506d, a release plate drive surface 506e, and mode change pawl contact surfaces 506f and 506g.

FIGS. 16(A)–(E) are views illustrating the operation of positioning unit 254 in an upshifting direction. In FIG. 16(A), positioning unit 254 is in a position such that front derailleur 70 is aligned with the small diameter front sprocket, and it is desired to move front derailleur 70 to the intermediate diameter front sprocket. In the position shown in FIG. 16(A), the tip of drive control pawl 530 is supported by the upper surface 606a of cam lobe 606, and the tip of drive control pawl 538 is located at the bottom of ramp 610c of cam lobe 610 such that drive control pawl 538 contacts abutment 578 on motion transmitting member 498 and holds motion transmitting member 498 in a "switch off" position. Thus, drive control pawl 538 and cam lobe 610 comprise a drive control mechanism that ordinarily maintains motion transmitting member 498 in the switch off position. Motion transmitting pawl 506 rests on the upper surface of drive tooth 694 on positioning ratchet 458.

The rider then rotates actuating component 118 counterclockwise (in FIG. 3) to the upshift position so that inner wire 80 is released by actuating component 118. This causes wire coupling member 302 to rotate clockwise in FIG. 6, and this motion is communicated via input link 306 to control plate 518 to rotate control plate 518 clockwise to the upshift position shown in FIG. 16(B). Clockwise rotation of control plate 518 causes drive control pawl 530 to slide down ramp 606c of cam lobe 606 and rotate counterclockwise to the position shown in FIG. 16(B). At the same time, drive control pawl 538 slides up ramp 614b of cam lobe 614 until drive control pawl 538 disengages from abutment 578 on motion transmitting member 498 and rests on upper surface 614a of cam lobe 614. Since drive control pawl 538 no longer contacts abutment 578, motion transmitting member 498 rotates clockwise until drive control pawl 538 contacts abutment 588, and motion transmitting member 498 is in a "switch on" position as shown in FIG. 16(B). Motion transmitting pawl 506, no longer being held by drive tooth 694 on positioning ratchet 458, rotates counterclockwise and rests on the outer peripheral surface 678 of positioning ratchet 458. The clockwise motion of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement is communicated to motion transmitting member 498. Positioning ratchet drive surface 506d of motion transmitting pawl 506 engages drive tooth 694 on positioning ratchet 458 and rotates positioning ratchet 458 and rotating member 454 to wind output control wire 78. During that time, positioning tooth 682 presses against pawl tooth 475 of positioning pawl 474 and rotates positioning pawl 474 clockwise until pawl tooth 475 clears the tip of positioning tooth 682. Then, positioning pawl 474 rotates counterclockwise so that pawl tooth 475 is located between positioning teeth 682 and 686 shown in FIG. 16(C).

When drive member 290 on crank arm 266 disengages from rotating member engaging member 394, positioning unit interface plate 402 and support plate 406 rotate back toward the position shown in FIG. 9(A), and this movement is communicated to motion transmitting member 498. Motion transmitting pawl 506 disengages from drive tooth 694 on positioning ratchet 458, and positioning ratchet 458 and rotating member 454 rotate clockwise in accordance with the biasing force of spring 456 until positioning tooth 682 abuts against pawl tooth 475. At this time, the front derailleur 70 is aligned with the intermediate diameter front sprocket as desired.

Assume, however, that at this time the rider has not yet rotated actuating component 118 back to the neutral position. In such a case, control plate 518 still would be in the upshift position with drive control pawl 538 resting on upper surface 614a of cam lobe 614. In this position, drive control pawl 538 would not be able to engage abutment 578 to stop the rotation of motion transmitting member 498. Thus, instead of returning to the switch off position shown in FIG. 16(A), motion transmitting member 498 would continue rotating to the switch on position shown in FIG. 16(B), rotating member engaging member 394 would return to the rotating member engaging position shown in FIG. 9(B), and another shift would result. Such an operation may be desirable in some applications and is within the scope of the present invention. However, in this embodiment drive control pawl 530 is provided to prevent such double shifts. More specifically, drive control pawl 530, having rotated counterclockwise as noted above, is now in the position to contact abutment 570 on motion transmitting member 498 and temporarily stop further rotation of motion transmitting member 498 so that motion transmitting member 498 is in the position shown in FIG. 16(D). Thus, drive control pawl 530 and cam lobe 606 comprise a drive control mechanism that inhibits rotation of motion transmitting member 498 back to the switch on position after the motion transmitting mechanism transmits motion from the rotating member engaging member 394 to rotating member 454.

When the rider returns actuating component 118 to the neutral position, control plate 518 likewise rotates back to the neutral position shown in FIG. 16(E). At that time, drive control pawl 530 slides up ramp 606c on cam lobe 606 and rotates clockwise until control pawl 530 disengages from abutment 570 on motion transmitting member 498 and the tip of control pawl 530 rests upon the upper surface 606a of cam lobe 606. Also, drive control pawl 538 slides down ramp 614b of cam lobe 614 and rotates counterclockwise so that the tip of drive control pawl 538 contacts abutment 578 on motion transmitting member 498 as shown in FIG. 16(E). Motion transmitting member 498 is now in the switch off position as shown originally in FIG. 16(A), but with positioning ratchet 458 and rotating member 454 in the position to align front derailleur 70 with the intermediate diameter front sprocket. The operation to shift from the intermediate diameter front sprocket to the large diameter front sprocket is the same.

FIGS. 17(A)–(E) are views illustrating the operation of positioning unit 254 in a downshifting direction. Some components are shown in transparent view to facilitate understanding of the operation of the components that play an important role in the downshift operation. Assume rotating member 454 is in a position such that front derailleur 70 is aligned with the intermediate diameter front sprocket (the same position shown in FIG. 16(E)), and it is desired to move front derailleur 70 to the small diameter sprocket. Accordingly, in the position shown in FIG. 17(A), the tip of drive control pawl 530 again is supported by the upper surface 606a of cam lobe 606, and the tip of drive control pawl 538 is located at the bottom of ramp 610c of cam lobe 610 such that drive control pawl 538 contacts abutment 578 on motion transmitting member 498. Motion transmitting pawl 506 rests on the upper surface of drive tooth 698 on positioning ratchet 458. Cam plate 494, which has the overall shape of a rounded and elongated isosceles triangle, includes an axially extending positioning tab 495 that abuts against a side surface 487 of release plate 486 to hold cam plate 494 in the position shown in FIG. 17(A).

The rider then rotates actuating component 118 clockwise (in FIG. 3) to the downshifted position so that inner wire 80 is pulled by actuating component 118. This causes wire coupling member 302 to rotate counterclockwise in FIG. 6, and this motion is communicated via input link 306 to control plate 518 to rotate control plate 518 counterclockwise as show in FIG. 17(B). Counterclockwise rotation of control plate 518 causes drive control pawl 530 to slide down ramp 606b of cam lobe 606 and rotate counterclockwise. At the same time, drive control pawl 538 slides up ramp 610c of cam lobe 610 and rotates clockwise until drive control pawl 538 disengages from abutment 578 on motion transmitting member 498 and rests on upper surface 610a of cam lobe 610. Since drive control pawl 538 no longer contacts abutment 578, motion transmitting member 498 rotates clockwise until drive control pawl 538 contacts abutment 588 and motion transmitting member 498 is in the switch on position shown in FIG. 17(B). This time, motion transmitting pawl 506 rotates clockwise by transition surface 618b of cam lobe 618, and mode change pawl 514 rotates clockwise to engage mode change pawl contact surface 506f on motion transmitting pawl 506 to temporarily hold motion transmitting pawl 506 in the position shown in FIG. 17(B). The movement of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement again is communicated to motion transmitting member 498, but this time release plate drive surface 506*e* of motion transmitting pawl 506 engages an abutment 487 on release plate 486 (which is currently in a first release member position), and release plate 486 rotates counterclockwise as shown in FIG. 17(C). Thus, motion transmitting member 498 functions as a release drive member for release plate 486 in this mode. As release plate 486 rotates, a base surface 496 of cam plate 494 contacts cam roller 478 attached to positioning pawl 474 and causes positioning pawl 474 to rotate in the clockwise direction. When the tip of pawl tooth 475 clears the tip of positioning tooth 682, positioning ratchet 458 and rotating member 454 rotate in the clockwise direction in accordance with the biasing force of spring 456 until positioning tooth 686 abuts against pawl tooth 476 to prevent uncontrolled rotation of positioning ratchet 458 and rotating member 454.

As release plate 486 continues to rotate counterclockwise toward a second release member position (the end of the range of motion of release plate 486), cam roller 478 reaches the rounded corner or cam lobe 497 of cam plate 494, thus causing cam plate 494 to rotate in the counterclockwise direction as shown in FIG. 17(C). This, in turn, allows positioning pawl 474 to rotate in the counterclockwise direction so that pawl tooth 476 moves away from positioning tooth 686 to allow positioning ratchet 458 and rotating member 454 to continue rotating in the clockwise direction until rotating member 454 is positioned so that front derailleur 70 is aligned with the smaller diameter sprocket.

If this system operated according to known systems which use a positioning pawl and positioning ratchet to control the shifting operation, the pawl tooth 476 would remain engaged with positioning tooth 686 until release plate 486 reversed direction (i.e., rotated in the clockwise direction) to complete the shifting operation. This is not necessary with a shift control mechanism constructed according to the present invention, since the rotatable cam plate 494 allows the positioning pawl 474 to immediately complete the shifting operation even when release plate 486 is still rotating in the counterclockwise direction. Thus, release plate 486 and cam plate 494 can be considered a release control mechanism that moves positioning pawl 474 to the position release position as release plate 486 moves toward the second release member position and allows positioning pawl 474 to return to the position maintaining position as release plate 486 continues to move toward the second release member position.

Figure 18B:
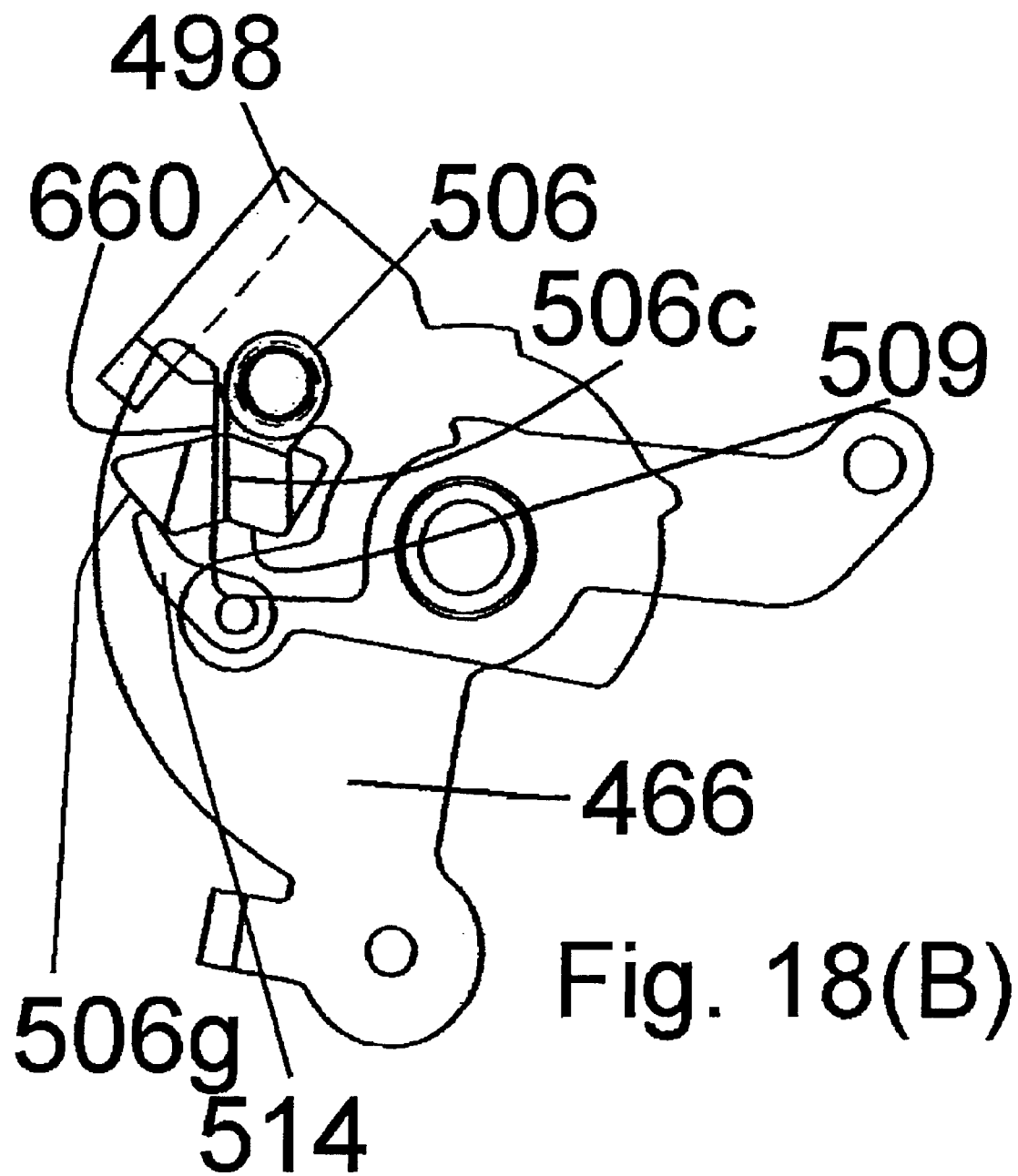

Another advantageous feature of the preferred embodiment is the manner in which the release plate 486 is allowed to reverse direction even when motion transmitting member 498 is still rotating in the counterclockwise direction. According to the preferred embodiment, when the motion transmitting member 498 is located in the position shown in FIGS. 17(C) and 18(A), downshift control surface 506*c* of motion transmitting pawl 506 begins to contact the pawl control surface 660 of middle plate 466 as shown in FIG. 18(A). Further rotation of motion transmitting member 498 causes motion transmitting pawl 506 to rotate counterclockwise as shown in FIGS. 17(D) and 18(B) which, in turn, causes motion transmitting pawl 506 to disengage from release plate 486. Mode change pawl 514 also disengages from mode change pawl contact surface 506*f* of motion transmitting pawl 506 and rests on mode change pawl contact surface 506*g*. Consequently, release plate 486 is allowed to return immediately to the position shown in FIG. 17(D), even when motion transmitting member 498 is still in the counterclockwise position shown in FIG. 17(D).

When drive member 290 on crank arm 266 disengages from rotating member engaging member 394, positioning unit interface plate 402 and support plate 406 again rotate back toward the position shown in FIG. 9(A), and this movement is communicated to motion transmitting member 498. Once again, assume that the rider has not yet rotated actuating component 118 back to the neutral position. In such a case, control plate 518 is still in the downshift position with drive control pawl 538 resting on upper surface 610*a* of cam lobe 610, but drive control pawl 530 contacts abutment 570 on motion transmitting member 498 so that motion transmitting member 498 is in the pause position shown in FIG. 17(E).

When the rider returns actuating component 118 to the neutral position, control plate 518 likewise rotates clockwise back to the neutral position shown in FIG. 17(F). At that time, drive control pawl 530 slides up ramp 606*b* of cam lobe 606 and rotates clockwise until drive control pawl 530 disengages from abutment 570 on motion transmitting member 498 and the tip of drive control pawl 530 rests upon upper surface 606*a* of cam lobe 606. At the same time, drive control pawl 538 slides down ramp 610*c* of cam lobe 610 and rotates counterclockwise so that the tip of drive control pawl 538 contacts abutment 578 on motion transmitting member 498 as shown in FIG. 17(F). Motion transmitting member 498 is now in the switch off position originally shown in FIG. 17(A), but positioning ratchet 458 and rotating member 454 are in the position to align front derailleur 70 with the small diameter front sprocket.

The operation to shift from the large diameter front sprocket to the intermediate diameter front sprocket is the same. However, in this case positioning ratchet 458 would be positioned initially such that pawl tooth 475 abuts against positioning tooth 686. As positioning pawl 474 rotates clockwise in response to pressure from cam plate 494, pawl tooth 475 clears positioning tooth 686, and positioning ratchet 458 rotates counterclockwise until positioning tooth 690 contacts pawl tooth 476. When positioning pawl 474 rotates counterclockwise as the cam lobe 497 of cam plate 494 reaches cam roller 478, pawl tooth 475 enters the space between positioning teeth 682 and 686, and pawl tooth 476 releases positioning tooth 690 so that positioning ratchet 458 and rotating member 454 rotate clockwise until positioning tooth 682 contacts pawl tooth 475, thus maintaining positioning ratchet 458 and rotatable member 454 in the position shown in FIG. 17(A).

Figure 19B:
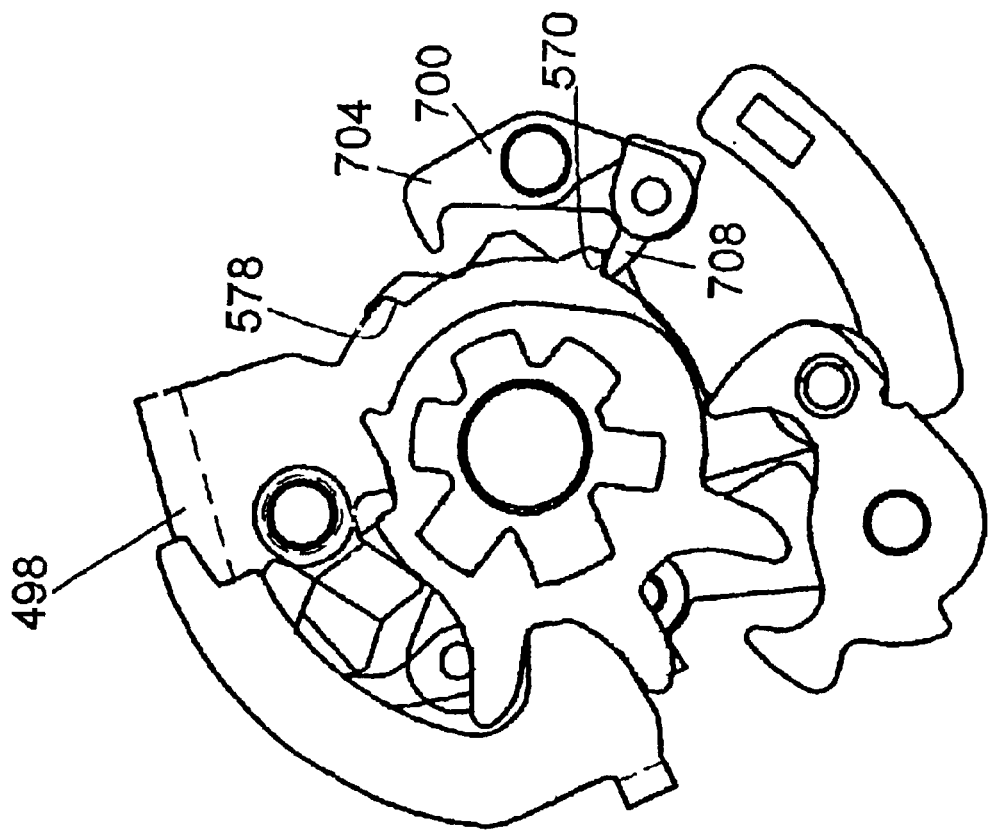
FIGS. 19(A) and 19(B) are views of an alternative embodiment of a drive control mechanism.
Figure 19A:
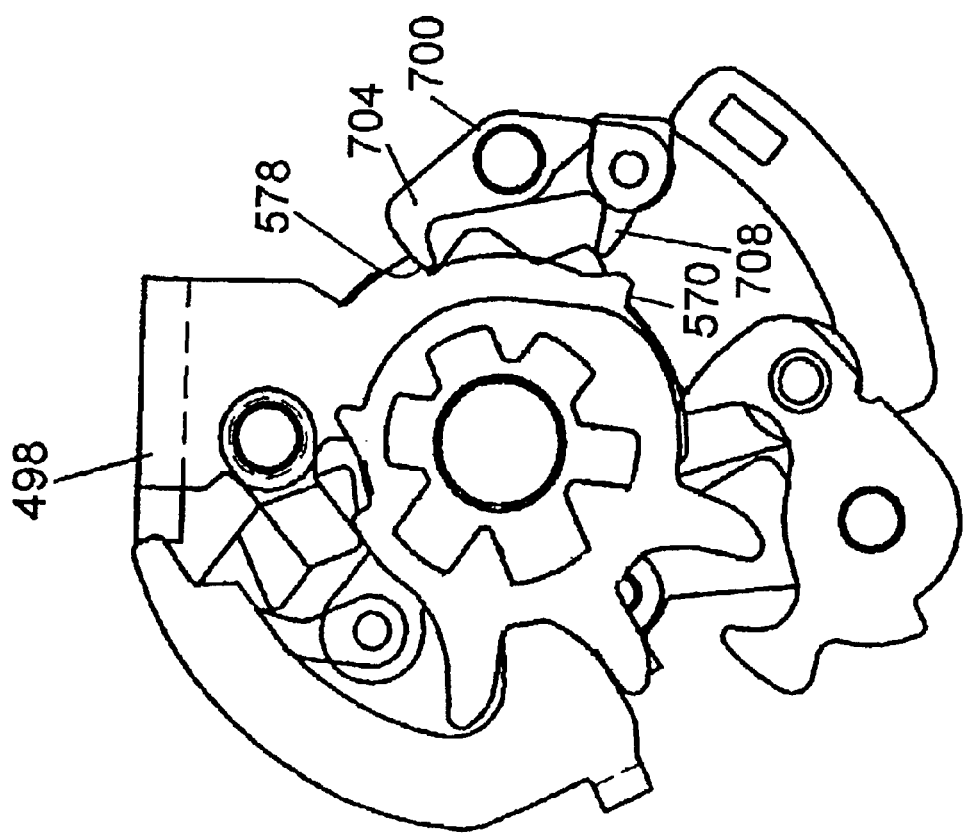

While the above is a description of various embodiments of the present invention, further modifications may be employed without departing from the spirit and scope of the present invention. For example, while separately operated drive control pawls 530 and 538 were provided in the preferred embodiment, the embodiment shown in FIGS. 19(A) and 19(B) show a single drive control pawl 700 with pawl teeth 704 and 708. Pawl tooth 704 contacts abutment 578 on motion transmitting member 498 when motion transmitting member 498 is in the home position as shown in FIG. 19(A). Pawl tooth 708 contacts abutment 570 on motion transmitting member 498 when motion transmitting member 498 is rotating clockwise to the switch off position and control plate 486 has not yet rotated to the neutral position as shown in FIG. 19(B).

Figure 20:
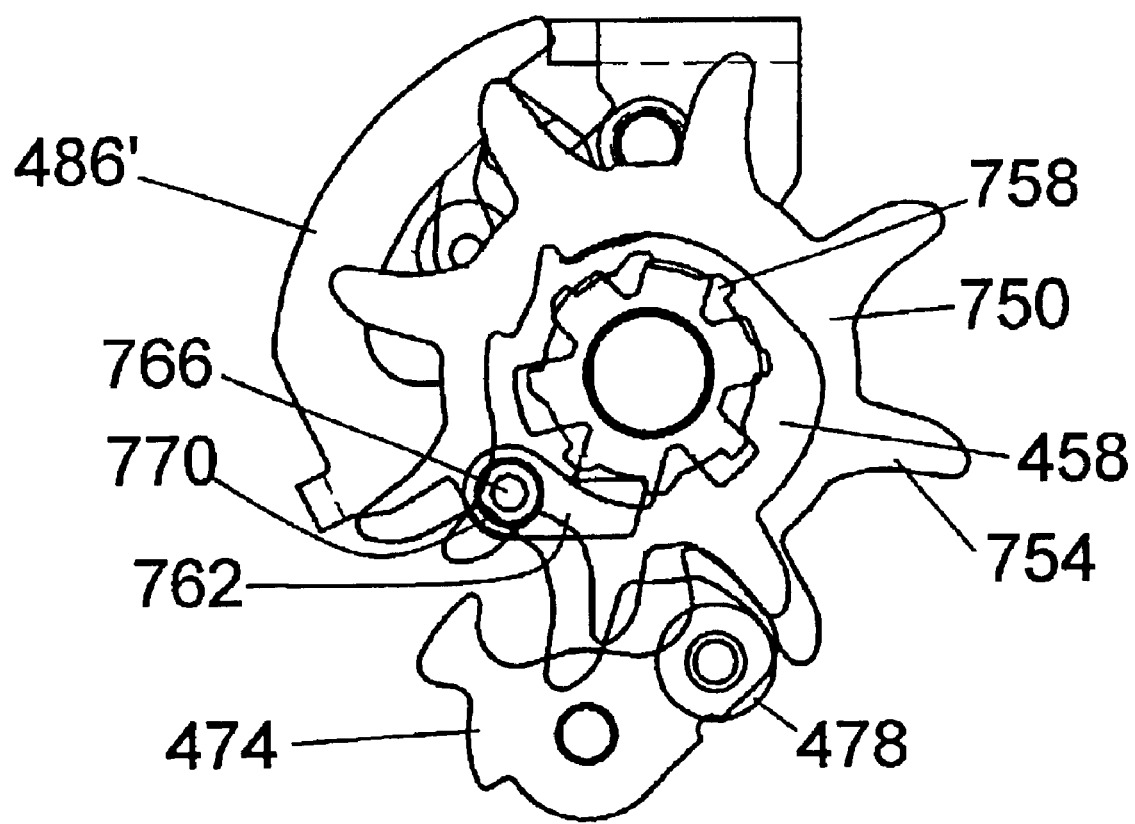
FIG. 20 is a side view of an alternative embodiment of a release mechanism.

While a cam plate 494 was used to control positioning pawl 474 in a downshifting operation in the preferred embodiment, FIG. 20 shows an embodiment wherein a cam wheel 750 controls the operation of positioning pawl 474. In this embodiment, cam wheel 750 is coaxially and rotatably mounted relative to positioning ratchet 458. Cam wheel 750 includes a plurality of circumferentially disposed cam teeth 754 and a plurality of circumferentially disposed cam drive teeth 758. A cam drive pawl 762 is pivotably mounted to a release plate 486' through a pivot shaft 766 and biased in a counterclockwise direction by a spring 770. When release plate 486' rotates in the counterclockwise direction during a downshift operation, cam drive pawl 762 engages one of the plurality of cam drive teeth 758 and rotates cam wheel 750 in the counterclockwise direction. One of the plurality of cam teeth 754 presses against cam roller 478 and causes positioning pawl 474 to rotate in the clockwise direction in the same manner as in the preferred embodiment. When the cam tooth 754 passes cam roller 478, positioning pawl 474 rotates in the counterclockwise direction to complete the downshift operation. Cam drive pawl 762 disengages from the corresponding cam drive tooth 758 when release plate 486' rotates in the clockwise direction.

Figure 21A:
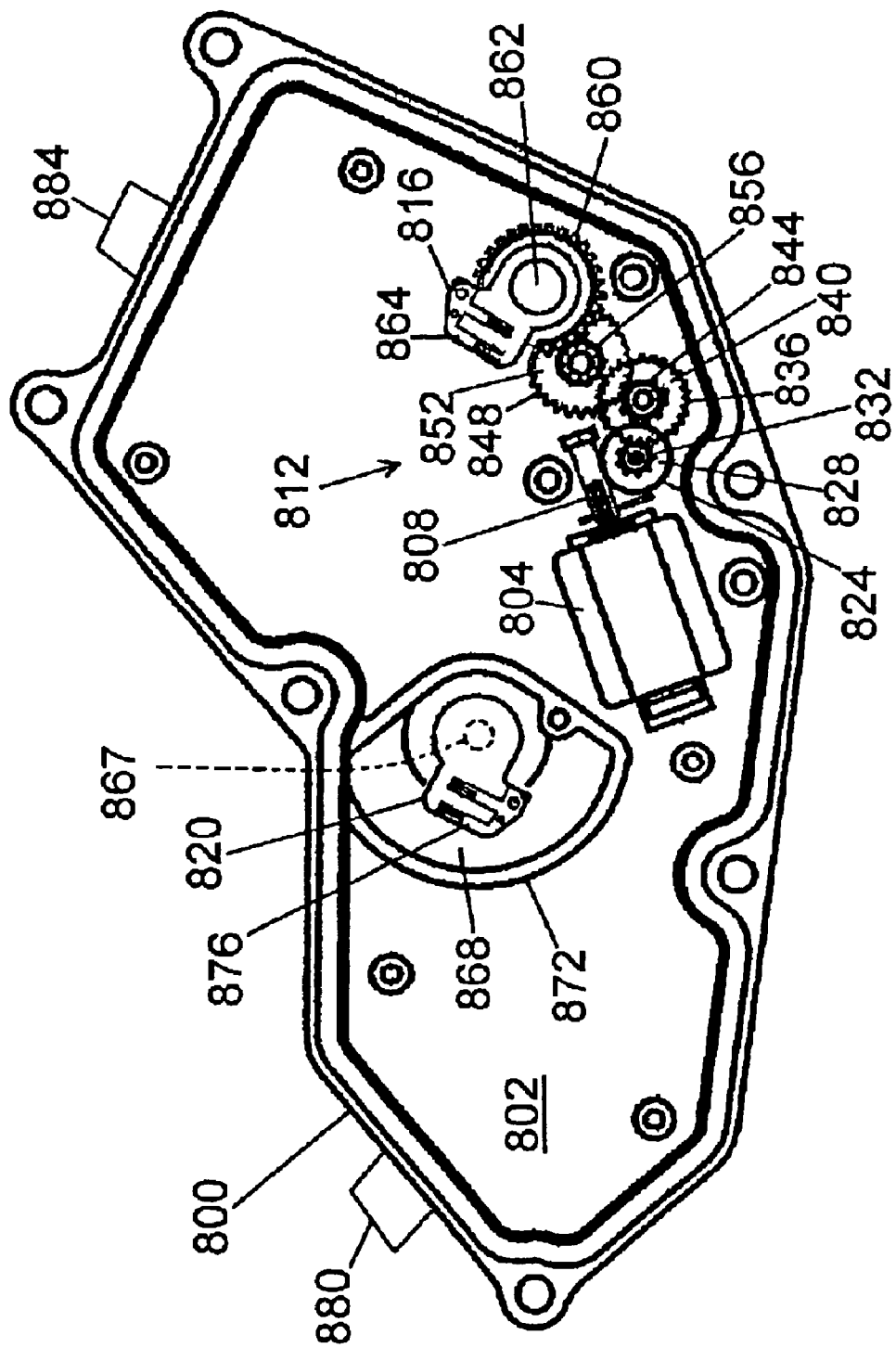
FIG. 21(A) is an outer side view of a housing for an alternative embodiment of an input unit.
Figure 21B:
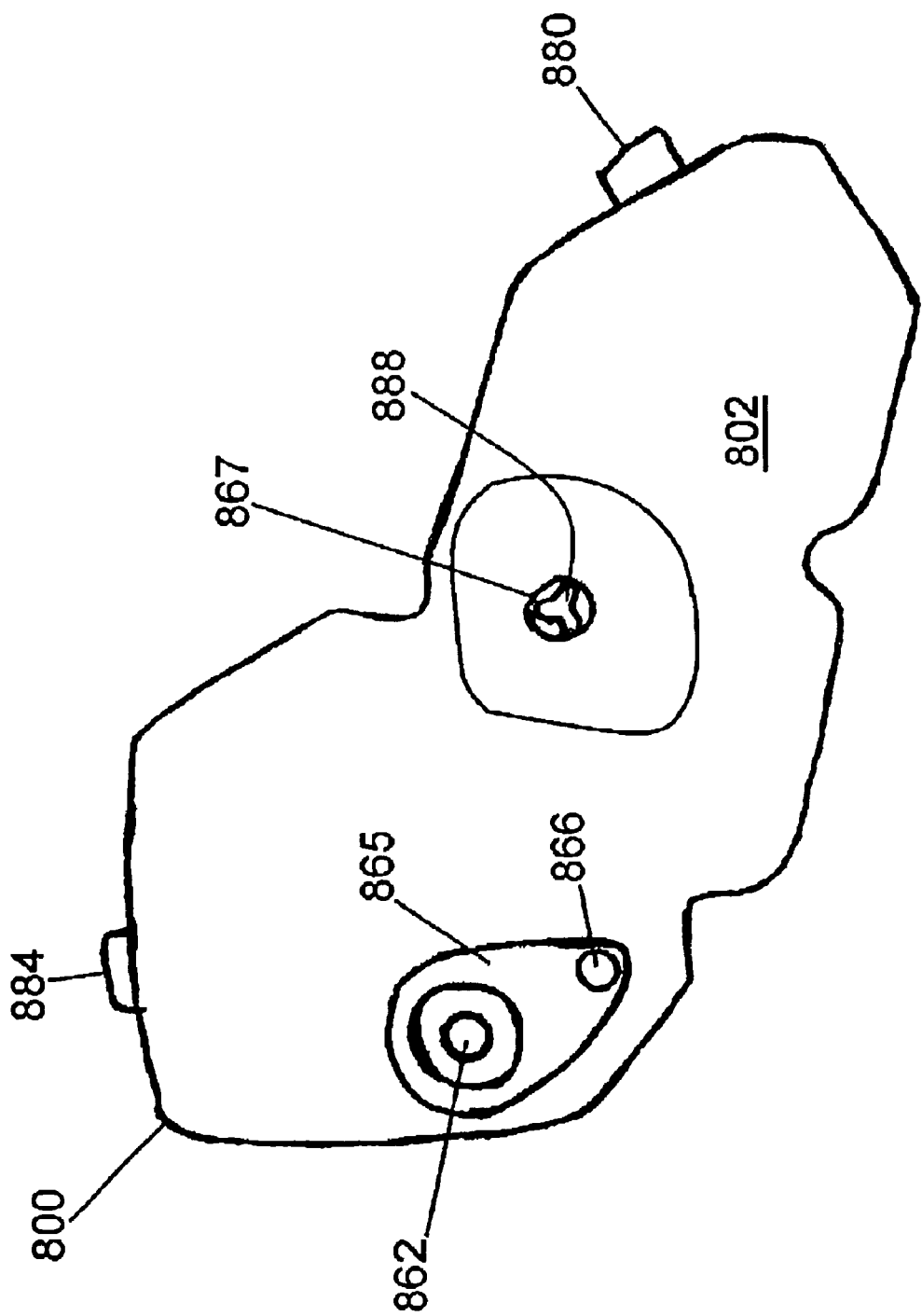
FIG. 21(B) is an inner side view of the housing.

While a manually operated input unit 250 was described in the foregoing embodiments, an electrically operated input unit may be used instead. The following describes such an input unit. FIGS. 21(A) and 21(B) are laterally outer and inner side views, respectively, of a mounting unit such as a housing 800 that may be operatively coupled directly or indirectly to positioning unit 254. The outer side of a wall 802 of housing 800 supports a motor 804, a gear reduction unit 812, an input brush unit 816 and an output brush unit 820.

Motor 804 includes a motor drive shaft 808 that meshes with a larger diameter gear portion 824 of a gear 828. A smaller diameter gear portion of 832 of gear 828 meshes with a larger diameter portion 836 of a gear 840, and a smaller diameter gear portion 844 of gear 840 meshes with a larger diameter gear portion 848 of a gear 852. A smaller diameter gear portion 856 of gear 852 meshes with a gear 860 supported by an axle 862 that passes through wall 802 to the inner side of housing 800.

Input brush unit 816 rotates coaxially together with gear 860, and it includes a conductive brush 864 that functions in a manner described below. Axle 862 supports a drive cam 865 FIG. 21(B) with a drive projection 866 on the inner side of housing 800. Output brush unit 820 is rotatably supported to housing 800 by an axle 867 that passes through wall 802 to the other side of housing 800. Output brush unit 820 is disposed within a chamber 868 defined by a wall 872, and it also includes a conductive brush 876 that functions in a manner described below. Electrical connectors 880 and 884 are attached to housing 800 to provide electrical communication with the various electrical components used in this embodiment.

As shown in FIG. 21(B), axle 867 includes male coupling splines 888 that project into a recess 892 formed on the inner side of housing 800. Male coupling splines are 888 used to couple output brush unit 820 to rotating member 454 in positioning unit 254 so that rotating member 454 and output brush unit 820 rotate coaxially as a unit. To accomplish, a coupling member 896 (FIGS. 22(A)–22(C)) is mounted to rotating member 454 and is ordinarily disposed in recess 892. In this embodiment, axle 318 of positioning unit 254 terminates in a central opening 900 formed in the inner side of boss 904 of coupling member 896, and female coupling splines 908 are formed on the outer side of boss 904 for engaging the male coupling splines 888 on axle 862. Coupling ears 912 and 916 are formed on a radially outer portion of rotating member 454, and a coupling projection 920 extends laterally from a radially outer portion of coupling member 896. Thus, coupling member 896 rotates integrally with rotating member 454 as a result of the locking engagement of coupling projection 920 with coupling ears 912 and 916, and output brush unit 820 rotates integrally with coupling member 896 and rotating member 454 as a result of the locking engagement of splines 888 and 908. Rotating member 454 and output brush unit 820 move between a downshifted (e.g., low) position shown in FIGS. 22(A) and 23(A), a neutral (e.g., middle) position shown in FIGS. 22(B) and 23(B), and an upshifted (e.g., top) position shown in FIGS. 22(C) and 23(C).

In the embodiments described above, wire coupling member 302 rotated input link 306 which, in turn, rotated control plate 518 to the upshift, neutral and downshift positions to produce the desired operation of assist mechanism 14. FIGS. 24(A)–24(C) and 25 show the structures that rotate control plate 518 in this embodiment. More specifically, drive cam 865 rotates an input transmission member drive member in the form of an input transmission drive link 924 that is rotatably supported to base plate 450 between a downshift position shown in FIG. 24(A), a neutral position shown in FIG. 24(B), and an upshift position shown in FIG. 24(C). Input brush unit 816 is shown superimposed on drive cam 865 to facilitate a discussion of the electronic controls associated with this embodiment later on.

Figure 24A:
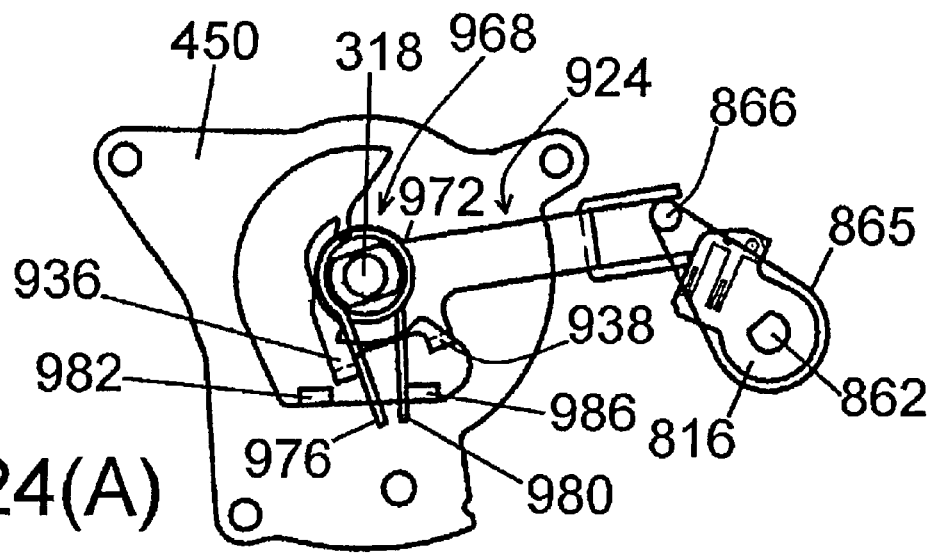
FIGS. 24(A)–24(C) are views showing movement of an input transmission drive member coupled to an input drive member position sensor.
Figure 24B:
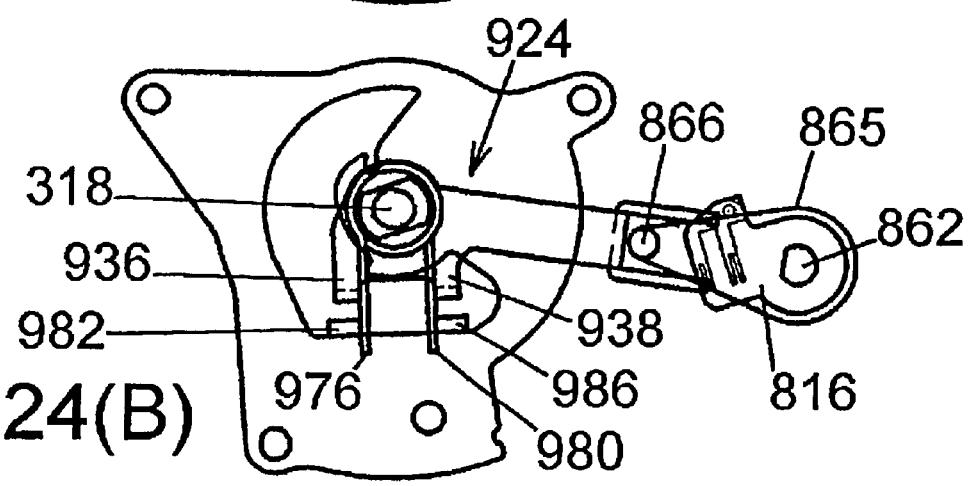
Figure 24C:
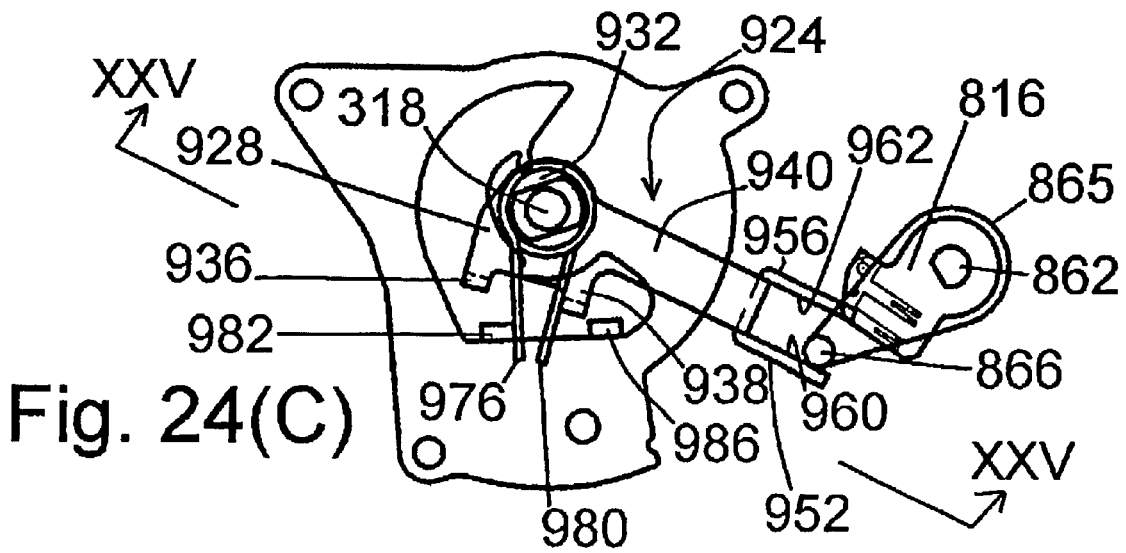
Figure 25:
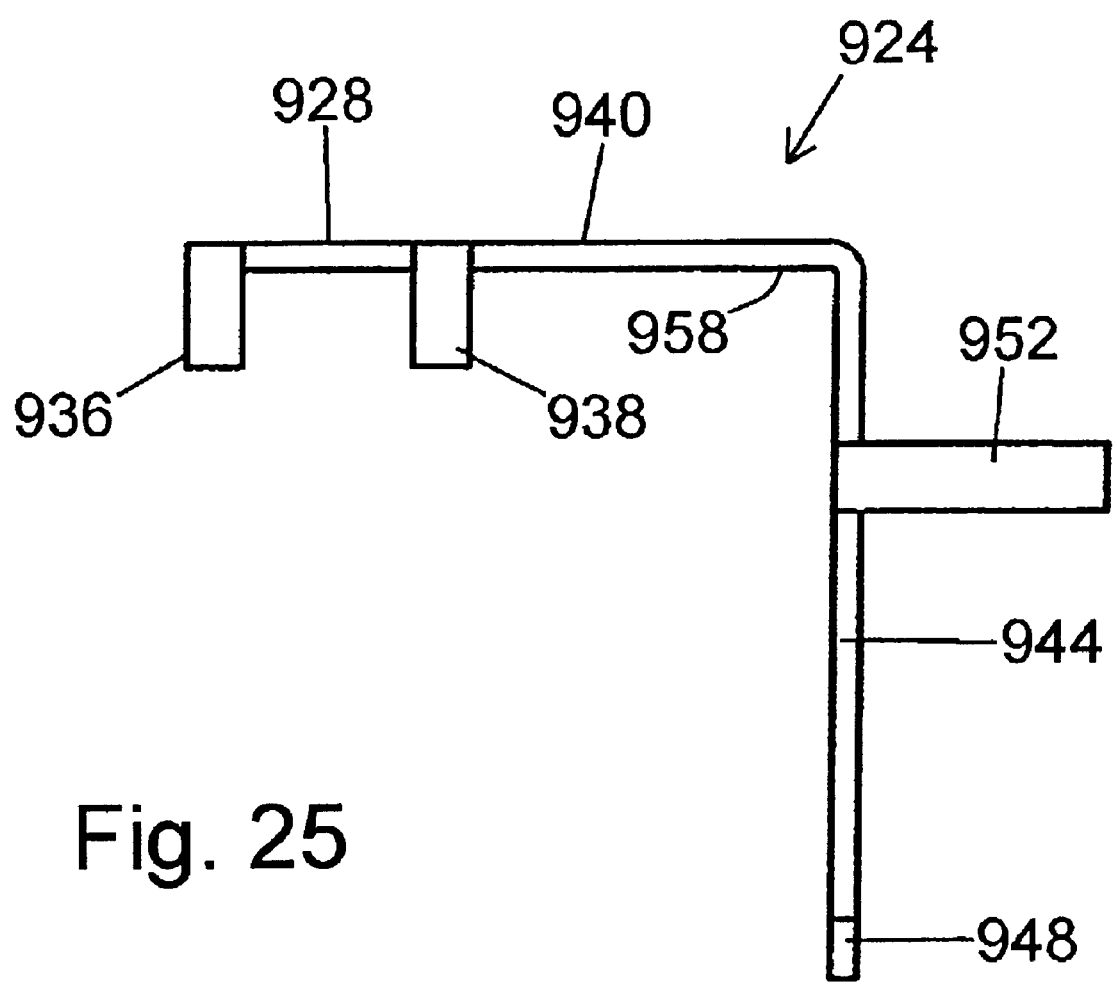
FIG. 25 is a view taken along line XXV—XXV in FIG. 24(C)

As shown in FIGS. 24(C) and 25, input transmission drive link 924 includes a first end such as an axle mounting portion 928 with an axle receiving opening 932 for receiving axle 318 therein (so that input transmission drive link 924 rotates coaxially with rotating member 454 and output brush unit 820), spring abutments 936 and 938, a radially extending portion 940, and an axially extending coupling portion 944 with a coupling tab 948 that fits into opening 605 in control plate 518. First and second drive ears 952 and 956 extend radially outwardly and form first and second drive surfaces 960 and 962, respectively. Coupling portion 944 and drive ears 952 and 956 are disposed at a radially extending second end 958 of input transmission drive link 924. Drive projection 866 is disposed between first and second drive surfaces 960 and 962, and the spacing of first and second drive surfaces 960 and 962 are such that drive projection 866 is spaced apart from first and second drive surfaces 960 and 962 when input transmission drive link 924 is in the neutral position as shown in FIG. 24(B). Of course, input transmission drive link 924 can take many different forms, and many structures could be used to rotate input transmission drive link 924 to the various positions, such as various link assemblies, rotating eccentric cams, rotating intermittent contact cams, and so on.

A biasing mechanism in the form of a spring 968 has a coiled section 972 and a pair of spring legs 976 and 980 for biasing input transmission drive link 924 to the neutral position. More specifically, coiled section 972 surrounds axle 318, and spring legs 976 and 980 contact spring abutments 982 and 986 formed on base plate 450 when input transmission drive link 924 is in the neutral position shown in FIG. 24(B). When input transmission drive link 924 rotates counterclockwise to the position shown in FIG. 24(A), spring abutment 936 presses against spring leg 976 so that spring 968 biases input transmission drive link 924 in the clockwise direction. On the other hand, when input transmission drive link 924 rotates clockwise to the position shown in FIG. 24(C), spring abutment 938 presses against spring leg 980 so that spring 968 biases input transmission drive link 924 in the counterclockwise direction.

Figure 26:
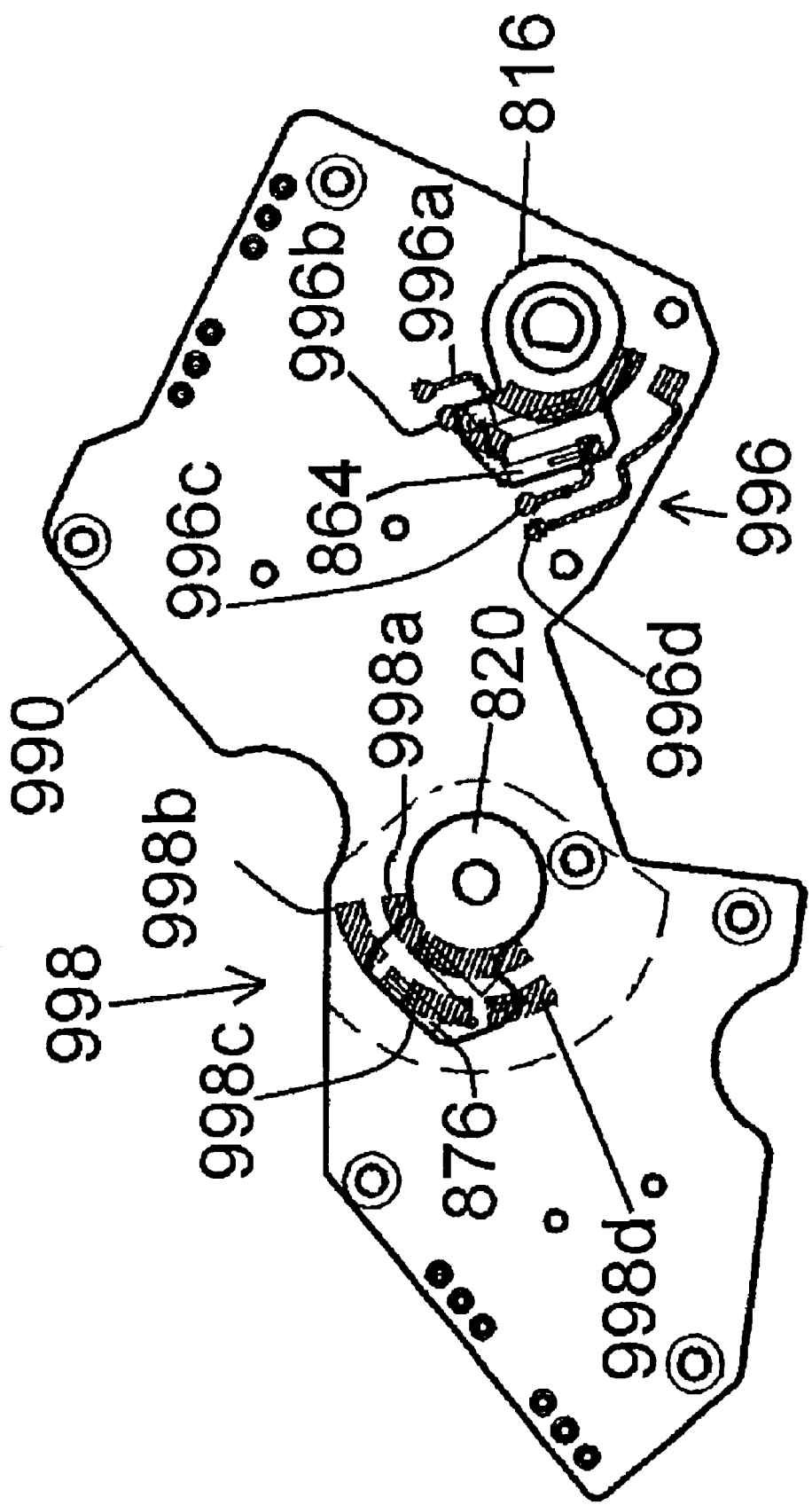
FIG. 26 is a view of a circuit board showing conductive traces used with the input drive member position sensor and the output transmission member position sensor.

FIG. 26 is a view of a circuit board 990 that is mounted to the outer side of housing 800. Circuit board 990 includes input position conductive traces 996 and output position conductive traces 998 (as well as other circuit elements that are not shown for easier understanding). Input conductive traces 996 include a common trace 996a, a downshift position trace 996b, a neutral position trace 996c, and an upshift position trace 996d. Input brush unit 816 is shown superimposed with input position conductive traces 996 to show the cooperation between the structures. These structures can be considered parts of an overall input drive member position sensor 1002 (FIG. 27) with a downshift position sensor 1002a, a neutral position sensor 1002b, and an upshift position sensor 1002c. Control unit 1000 uses the resulting signal to determine the position of drive cam 865 and therefore input transmission drive link 924. In the position shown in FIG. 26, input brush unit 816 is in the neutral position, wherein brush 864 connects neutral position trace 996c to common trace 996a.

Output conductive traces 998 include a common trace 998a, a downshifted (e.g., low) position trace 998b, a neutral (e.g., middle) position trace 998c, and an upshifted (e.g., top) position trace 998d. Output brush unit 820 is shown superimposed with output position conductive traces 998 to show the cooperation between the structures. These structures can be considered parts of an overall output transmission member position sensor 1004 (FIG. 27) with a downshift position sensor 1004a, a neutral position sensor 1004b, and an upshift position sensor 1004c. Control unit 1000 uses the resulting signal to determine the position of rotating member 454. In the position shown in FIG. 26, output brush unit 820 is in the neutral position, wherein brush 876 connects neutral position trace 998c to common trace 998a.

Figure 27:
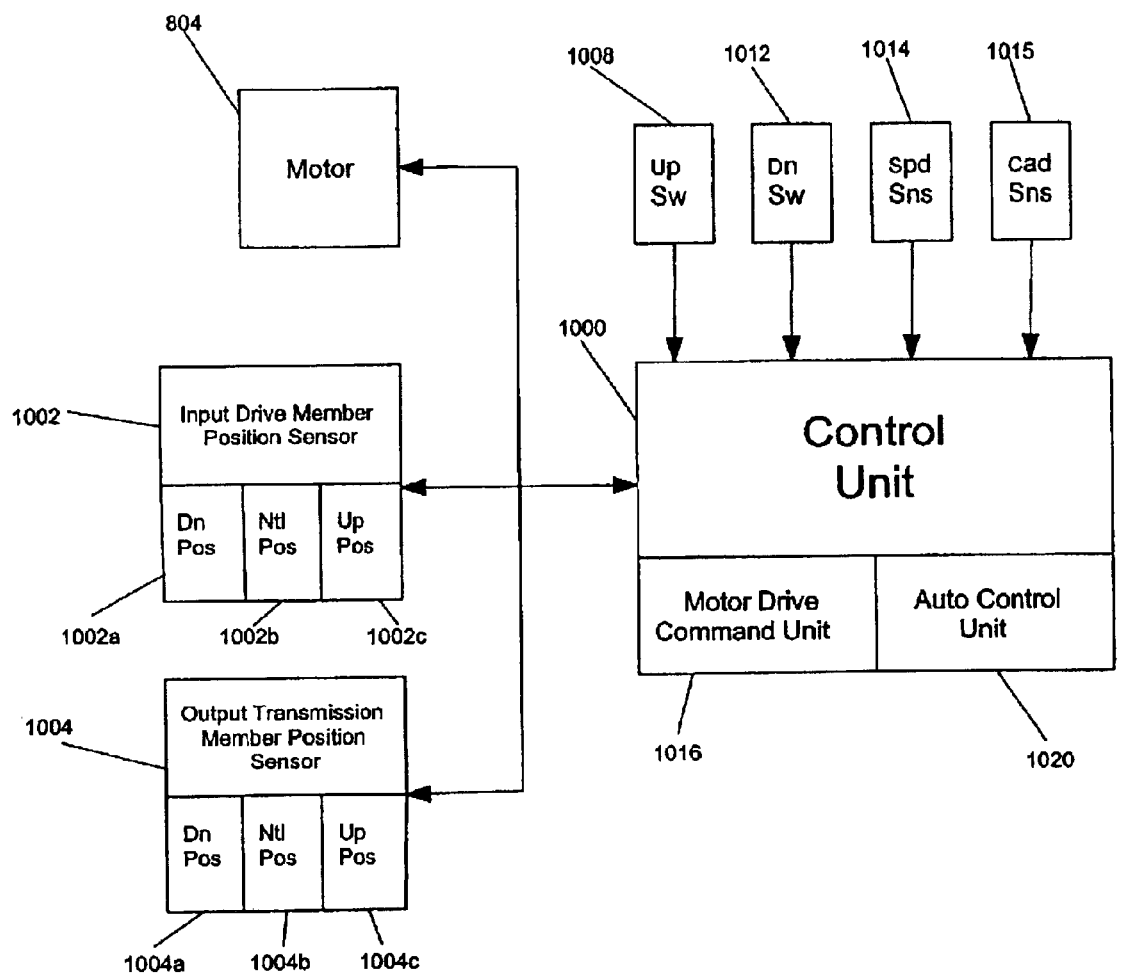
FIG. 27 is a block diagram of electrical components used for controlling the operation of the assist apparatus.

FIG. 27 is a block diagram of electrical components used for controlling the operation of assist mechanism 14. In this embodiment, control unit 1000 receives signals from input drive member position sensor 1002, output transmission member position sensor 1004, a manually operated upshift switch 1008, a manually operated downshift switch 1012, a speed sensor 1014 and a cadence sensor 1015. Of course control unit 1000 may receive signals from any number of other inputs, such as the rider's physical characteristics, terrain data, and so on. Upshift switch 1008 and downshift switch 1012 typically are mounted at some convenient location on handlebar 50, and they may take many different forms such as buttons, toggle switches, levers, twist grips coupled to switching mechanisms, and so on. Speed sensor 1014 typically comprises a conventional sensor mounted to frame 18 for sensing the passage of a magnet mounted to front wheel 46 or rear wheel 54, but of course it may comprise any structure (e.g., optical or electromagnetic) that accomplishes the same purpose. Similarly, cadence sensor 1015 typically comprises a conventional sensor mounted to frame 18 for sensing the passage of a magnet mounted to pedal assembly 58, but of course it may comprise any structure (e.g., optical or electromagnetic) that accomplishes the same purpose.

Control unit 1000 includes a motor drive command unit 1016 for providing commands that drive motor 804 (directly, or indirectly through a motor interface). Upshift switch 1008 and downshift switch 1012 typically are used for manually requesting an upshift or a downshift operation, respectively, and control unit 1000 causes motor drive command unit 1016 to provide commands to operate motor 804 accordingly. In this embodiment, control unit 1000 also includes an automatic control unit 1020 which causes motor drive command unit 1016 to provide commands to operate motor 804 automatically according to any number of the inputs and according to any desired algorithm. Such commands may comprise analog or digital messages, direct drive signals, or any other signal suitable for the particular application. Control unit 1000, motor drive command unit 1016 and automatic control unit 1020 may comprise a suitably programmed microprocessor disposed on circuit board 990, or any other suitably configured hardware, firmware or software implementation disposed or distributed anywhere that is convenient for the application.

The operation of this embodiment is rather straightforward. Input transmission drive link 924 ordinarily is located in the neutral position as shown in FIG. 24(B) and determined by input drive member position sensor 1002. If a downshift command is generated either by the operation of downshift switch 1012 or automatic control unit 1020, then motor drive command unit 1016 generates commands to cause motor 804 to rotate drive cam 865 and thereby move input transmission drive link 924 in the downshift direction (counterclockwise) until input drive member position sensor 1002 senses input transmission drive link 924 in the downshift position shown in FIG. 24(A). At this time, in this embodiment, control unit 1000 immediately causes motor drive command unit 1016 to generate commands to cause motor 804 to move input transmission drive link 924 in the opposite direction until input transmission drive link 924 returns to the neutral position shown in FIG. 24(B).

Similarly, if an upshift command is generated either by the operation of upshift switch 1008 or automatic control unit 1020, then motor drive command unit 1016 generates commands to cause motor 804 to rotate drive cam 865 and thereby move input transmission drive link 924 in the upshift direction (clockwise) until input drive member position sensor 1002 senses input transmission drive link 924 in the upshift position shown in FIG. 24(C). At this time control unit 1000 immediately causes motor drive command unit 1016 to generate commands to cause motor 804 to move input transmission drive link 924 in the opposite direction until input transmission drive link 924 returns to the neutral position shown in FIG. 24(B).

Figure 28:
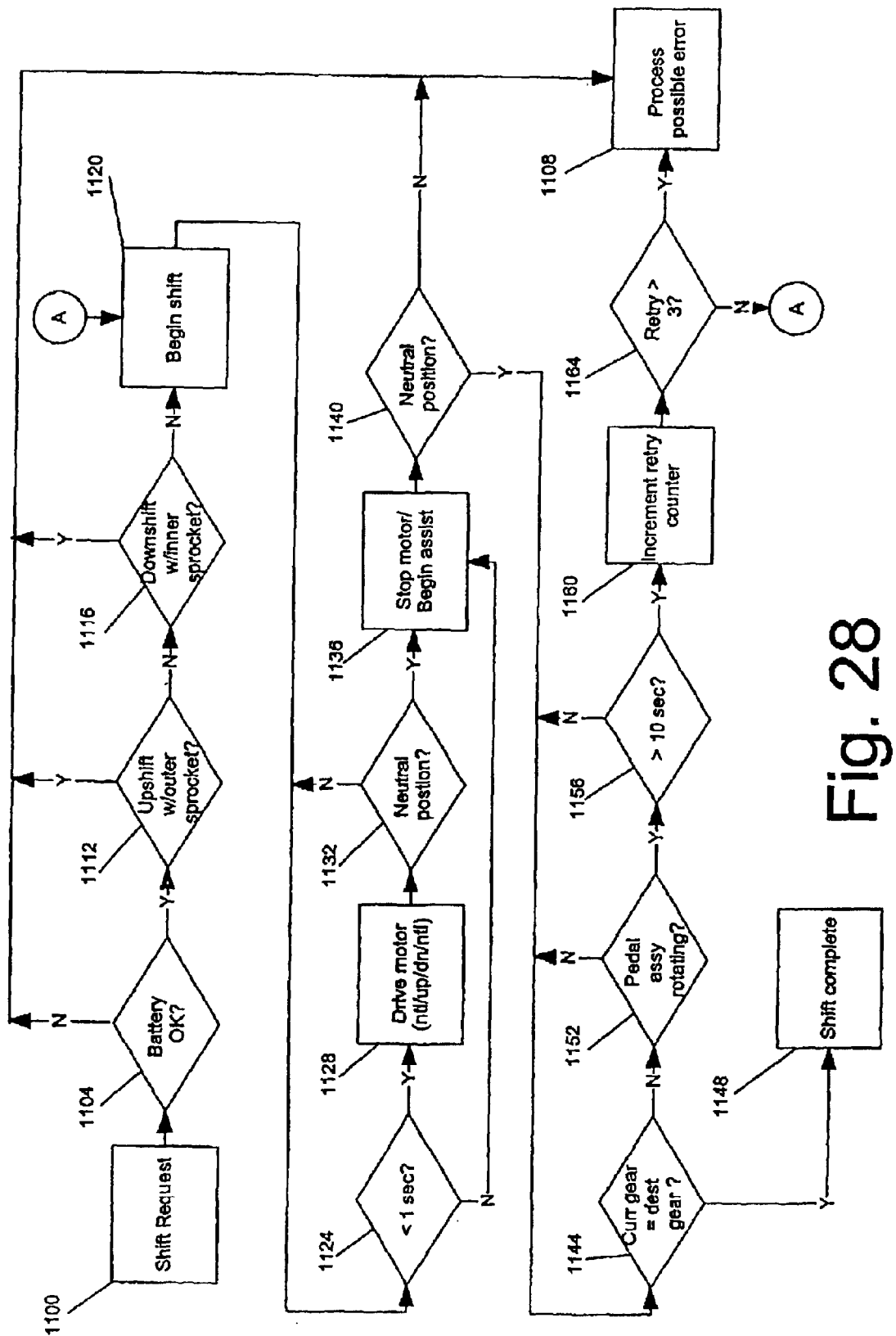
FIG. 28 is a flow chart showing the operation of the control unit shown in FIG. 27.

The signals provided by input drive member position sensor 1002 and output transmission member position sensor 1004 may be combined with suitable programming of control unit 1000 to provide a mechanism for detecting possible malfunctions of assist mechanism 14. FIG. 28 is a flow chart showing a possible operation of control unit 1000 for that purpose. Assume a shift request is made in a step 1100, either by pressing upshift switch 1008 or downshift switch 1012, or by operation of automatic control unit 1020. It is then ascertained in a step 1104 whether a battery condition (e.g., voltage) is sufficient to drive motor 804 for the desired shift. If not, then a possible error is processed in a step 1108. Such a process could include a warning to the rider such as a warning tone and/or a visual signal such as an error message. Additionally, a prohibition condition could be set within control unit 1000 to prevent any further attempt to operate assist mechanism 14 by control unit 1000 until the matter is resolved.

If battery condition is acceptable, it is then ascertained in a step 1112 whether an upshift command has been made when the front derailleur 70 is already engaged with the outermost sprocket 66. If so, then the appropriate error processing is performed in step 1108. Otherwise, it is then ascertained in a step 1116 whether a downshift command has been made when the front derailleur 70 is already engaged with the innermost sprocket 66. If so, then the appropriate error processing is performed in step 1108. Otherwise, the shifting operation is allowed to begin in a step 1120. This step may include resetting of a timer used to control the shifting operation as well as setting any other variables (such as a retry counter discussed below) used in the process.

In this embodiment, it is assumed that motor 804 can complete its operation to cause input transmission drive link 924 to move from the neutral position, to the desired upshift or downshift position, and back to the neutral position in approximately one second. Accordingly, it is then ascertained in a step 1124 whether less than one second has elapsed since the beginning of the shifting operation in step 1120. If so, then motor drive command unit 1016 in control unit 1000 issues the appropriate commands to drive motor 804 in a step 1128. Step 1128 represents whatever movement of motor 804 is needed to cause input transmission drive link 924 to move from the neutral position, to the desired upshift or downshift position, and back to the neutral position. It is then ascertained in a step 1132 whether input transmission drive link 924 has returned back to the neutral position. If not, then processing returns to step 1124. Otherwise, motor 804 is stopped in a step 1136. Motor 804 also is stopped if it is ascertained in step 1124 that more than one second has elapsed since the beginning of the shifting operation in step 1120. In any event, step 1136 also represents the start of the mechanical phase of the assist operation wherein one of drive members 290 contacts rotating member engaging member 394 to assist the shifting operation. In step 1136, various control variables may be initialized as is appropriate for the application.

It is then ascertained in a step 1140 whether input transmission drive link 924 has returned back to the neutral position. This step is optionally performed as a double check on the position of input transmission drive link 924, but this step also may be used to determine whether a malfunction occurred if it is ascertained in step 1124 that more than one second has elapsed since the beginning of the shifting operation in step 1120 without the neutral position being ascertained in step 1132. If input transmission drive link 924 is not in the neutral position at this time, then the appropriate error processing is performed in step 1108. Otherwise, it is ascertained in a step 1144 whether the current gear indicated by output transmission member position sensor 1004 is the same as the requested destination gear. If so, then shifting is considered complete in a step 1148.

In this embodiment, it is assumed that shifting will complete in ten seconds as long as pedal assembly 58 is rotating. Since many conditions can affect the shifting characteristics of any derailleur (such as the type of chain and sprocket used, whether the chain and sprockets are designed with any shift facilitating structures, the forces exerted by the rider and the bicycle, and so on), it is also assumed that it may take longer to shift the chain under some circumstances. Accordingly, the present embodiment retries the shifting operation three times when a failure is detected. To that end, it is ascertained in a step 1152 whether cadence sensor 1015 indicates that the pedal assembly 58 is rotating. If not, processing returns to step 1144. Otherwise, it is ascertained in a step 1156 whether more than ten seconds has elapsed since the assist operation was begun in step 1136. If not, then processing returns to step 1144. If more then ten seconds has elapsed, then a retry counter programmed in control unit 1000 is incremented by one in a step 1160, and it is then ascertained in a step 1164 whether more than three retries have been attempted. If so, then the appropriate error processing is performed in step 1108. Otherwise, processing reverts back to step 1120 to retry the operation.

Of course, the foregoing electronic control system and method could be adapted to any type of bicycle transmission, such as internal hub transmissions, combination hub/derailleur transmissions, continuously variable transmissions, and so on. The system also could be adapted to uses other than bicycle transmissions. In all cases, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. In a bicycle control device that uses power from a rotating member to assist the operation of a bicycle mechanism, wherein the control device includes an input member that requests assistance of the rotating member and an output member that is assisted by the rotating member, wherein the input member electrically moves from a first position to a second position and then to a third position to request assistance of the rotating member, a method of operating the control device comprising the steps of:
   providing an input signal for moving the input member from the first position to the second position and then to the third position;
   sensing a position of the input member with an input position sensor; and
   determining whether the input position sensor indicates the input member is in the third position.

2. In a bicycle shift control device that uses power from a rotating member to assist the operation of a bicycle transmission, wherein the shift control device includes an input transmission member that requests assistance of the rotating member and an output transmission member that is assisted by the rotating member, wherein the input transmission member electrically moves between a first position and at least one of an upshift position and a downshift position, a method of operating the shift control device comprising the steps of:
   providing an input signal for moving the input transmission member from the first position to the at least one of the upshift position and the downshift position and to a second position;
   sensing a position of the input transmission member with an input position sensor; and
   determining whether the input position sensor indicates the input transmission member is in the second position.

3. The method according to claim 2 wherein the first position is the same as the third position.

4. The method according to claim 2 wherein the determining step comprises the steps of:
   measuring a predetermined time period after providing the input signal; and
   determining whether the input transmission member is in the second position within the predetermined time period.

5. The method according to claim 4 wherein the first position is the same as the third position.

6. The method according to claim 5 wherein the predetermined time period is approximately one second.

7. In a bicycle shift control device that uses power from a rotating member to assist the operation of a bicycle transmission, wherein the shift control device includes an input transmission member that requests assistance of the rotating member and an output transmission member that is assisted by the rotating member, wherein the input transmission member electrically moves between a first position and at least one of an upshift position and a downshift position to request assistance of the rotating member, and wherein the output transmission member is assisted by the rotating member from a current position to a destination position, a method of operating the shift control device comprising the steps of:

(a) providing an input signal for moving the input transmission member from the first position to the at least one of the upshift position and the downshift position;

(b) sensing a position of the output transmission member with an output position sensor; and (c) determining whether the output position sensor indicates the output transmission member is in the destination position.

8. The method according to claim 7 wherein the determining step comprises the step of sensing whether a rotating member of the bicycle transmission is rotating with a rotation sensor.

9. The method according to claim 7 wherein the determining step comprises the steps of:

measuring a first predetermined time period after providing the input signal; and determining whether the output position sensor indicates the output transmission member is in the destination position within the first predetermined time period.

10. The method according to claim 9 wherein the first predetermined time period is approximately ten seconds.

11. The method according to claim 9 further comprising the steps of repeating steps (a)–(c) a predetermined number of times if the output transmission member is not in the destination position within the first predetermined time period.

12. The method according to claim 9 wherein the determining step further comprises the step of sensing whether a rotating member of the bicycle transmission is rotating with a rotation sensor.

13. The method according to claim 12 wherein the measuring step comprises the step of measuring the first predetermined time period only when the rotation sensor indicates the rotating member is rotating.

14. The method according to claim 13 further comprising the steps of repeating steps (a)–(c) a predetermined number of times if the output transmission member is not in the destination position within the first predetermined time period.

15. The method according to claim 14 wherein the first predetermined time period is approximately ten seconds.

16. The method according to claim 14 wherein the predetermined number of times equals three.

17. The method according to claim 7 wherein the input transmission member moves from the first position to the at least one of the upshift position and the downshift position and to a second position in response to the input signal.

18. The method according to claim 17 further comprising the steps of: sensing a position of the input transmission member with an input position sensor; and determining whether the input position sensor indicates the input transmission member is in the second position.

19. The method according to claim 18 wherein the first position is the same as the third position.

20. The method according to claim 18 wherein the determining step comprises the steps of:

measuring a first predetermined time period after providing the input signal; and determining whether the output position sensor indicates the output transmission member is in the destination position within the first predetermined time period.

21. The method according to claim 20 wherein the determining step further comprises the steps of:

measuring a second predetermined time period after providing the input signal; and determining whether the input transmission member is in the second position within the second predetermined time period.

22. The method according to claim 21 further comprising the steps of repeating steps (a)–(c) a predetermined number of times if the output transmission member is not in the destination position within the first predetermined time period.

23. The method according to claim 21 wherein the determining step further comprises the step of sensing whether a rotating member of the bicycle transmission is rotating with a rotation sensor.

24. The method according to claim 23 wherein the measuring step comprises the step of measuring the first predetermined time period only when the rotation sensor indicates the rotating member is rotating.

25. The method according to claim 24 further comprising the steps of repeating steps (a)–(c) a predetermined number of times if the output transmission member is not in the destination position within the first predetermined time period.

26. The method according to claim 25 wherein the first position is the same as the third position.

27. The method according to claim 26 wherein the first predetermined time period is approximately ten seconds.

28. The method according to claim 26 wherein the second predetermined time period is approximately one second.

29. The method according to claim 26 wherein the predetermined number of times equals three.

* * * * *